United States Patent
Niida

(10) Patent No.: US 10,382,728 B2
(45) Date of Patent: Aug. 13, 2019

(54) EXTERNAL DEVICE CONTROL METHOD, IMAGING DEVICE CONTROL METHOD, IMAGING SYSTEM CONTROL METHOD, EXTERNAL DEVICE, IMAGING DEVICE, AND IMAGING SYSTEM

(71) Applicant: CANON KABUSHIKI KAISHA, Tokyo (JP)

(72) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 14/899,647

(22) PCT Filed: Jun. 23, 2014

(86) PCT No.: PCT/JP2014/003353
§ 371 (c)(1),
(2) Date: Dec. 18, 2015

(87) PCT Pub. No.: WO2014/208073
PCT Pub. Date: Dec. 31, 2014

(65) Prior Publication Data
US 2016/0150193 A1 May 26, 2016

(30) Foreign Application Priority Data

Jun. 26, 2013 (JP) ................. 2013-133947

(51) Int. Cl.
*H04N 7/18* (2006.01)
*G03B 17/56* (2006.01)
(Continued)

(52) U.S. Cl.
CPC ........... *H04N 7/183* (2013.01); *G03B 17/561* (2013.01); *G03B 37/02* (2013.01);
(Continued)

(58) Field of Classification Search
None
See application file for complete search history.

(56) References Cited

U.S. PATENT DOCUMENTS 4,321,625 A * 3/1982 Smith ................ H04N 5/23203
348/211.11
4,369,467 A * 1/1983 Smith ................ H04N 5/23203
348/211.1
(Continued)

FOREIGN PATENT DOCUMENTS

CN 102420972 A 4/2012
CN 103034224 A 4/2013
(Continued)

OTHER PUBLICATIONS

International Search Report and Written Opinion for PCT/JP2014/003353 and notification of transmittal of the ISR/WO, dated Jul. 29, 2014.

*Primary Examiner* — Jayanti K Patel
*Assistant Examiner* — Shadan E Haghani
(74) *Attorney, Agent, or Firm* — Canon U.S.A., Inc. I.P. Division

(57) ABSTRACT

A determination as to whether or not a random operation is able to be performed for a preset tour of a surveillance camera may be easily made, and user's operability may be improved. A client device transmits a command for making an inquiry about the capability of the surveillance camera for a random operation regarding a preset tour. The surveillance camera receives the command, and transmits capability information of the random operation to the client device. The client device analyzes the received information, and changes the GUI display of the client device.

12 Claims, 19 Drawing Sheets

(51) Int. Cl.
*G03B 37/02* (2006.01)
*G08B 13/196* (2006.01)
*H04N 5/232* (2006.01)
*H04N 5/44* (2011.01)

(52) U.S. Cl.
CPC ..... *G08B 13/1963* (2013.01); *H04N 5/23293* (2013.01); *H04N 5/23296* (2013.01); *H04N 5/44* (2013.01); *H04N 7/181* (2013.01); *H04N 5/23203* (2013.01)

(56) References Cited

U.S. PATENT DOCUMENTS

| | | | | |
|---|---|---|---|---|
| 4,570,163 | A * | 2/1986 | Smith | H04N 5/23203 340/13.37 |
| 4,675,672 | A * | 6/1987 | Smith | H04N 5/23203 340/13.37 |
| 5,170,255 | A * | 12/1992 | Yamada | H04N 5/23248 348/207.99 |
| 5,872,594 | A | 2/1999 | Thompson | |
| 6,313,875 | B1 * | 11/2001 | Suga | H04N 7/142 348/14.08 |
| 9,445,003 | B1 * | 9/2016 | Lelescu | H04N 5/23232 |
| 9,538,121 | B2 * | 1/2017 | Saijo | H04N 5/77 |
| 2003/0202101 | A1 | 10/2003 | Monroe et al. | |
| 2004/0042783 | A1 | 3/2004 | Diana et al. | |
| 2005/0285950 | A1 | 12/2005 | Oya | |
| 2006/0070111 | A1 * | 3/2006 | Kurosawa | H04N 7/17318 725/105 |
| 2007/0273845 | A1 * | 11/2007 | Birmingham | G03B 21/008 353/101 |
| 2009/0027495 | A1 * | 1/2009 | Oskin | G08B 13/19656 348/143 |
| 2010/0097473 | A1 * | 4/2010 | Park | H04N 5/23203 348/159 |
| 2010/0118162 | A1 * | 5/2010 | Saijo | H04N 5/23203 348/231.6 |
| 2010/0182438 | A1 * | 7/2010 | Mohammed | H04N 5/23203 348/207.11 |
| 2011/0149072 | A1 | 6/2011 | McCormack | |
| 2011/0175999 | A1 | 7/2011 | McCormack | |
| 2011/0228086 | A1 * | 9/2011 | Cordero | G08B 13/19636 348/143 |
| 2012/0039579 | A1 * | 2/2012 | Esposito | H04N 9/7921 386/224 |
| 2012/0257095 | A1 * | 10/2012 | Velazquez | H04N 5/2252 348/333.01 |
| 2013/0093907 | A1 * | 4/2013 | Niida | H04L 65/4092 348/211.4 |
| 2014/0049600 | A1 * | 2/2014 | Goldner | H04N 7/18 348/36 |
| 2014/0267706 | A1 * | 9/2014 | Springer | H04N 7/18 348/143 |
| 2014/0285659 | A1 * | 9/2014 | Kim | H04N 7/183 348/143 |

FOREIGN PATENT DOCUMENTS

| | | |
|---|---|---|
| EP | 2343879 A1 | 7/2011 |
| JP | 05-284399 A | 10/1993 |
| JP | 2006-211371 A | 8/2006 |
| JP | 2006-311309 A | 11/2006 |
| JP | 2011-015040 A | 1/2011 |

* cited by examiner

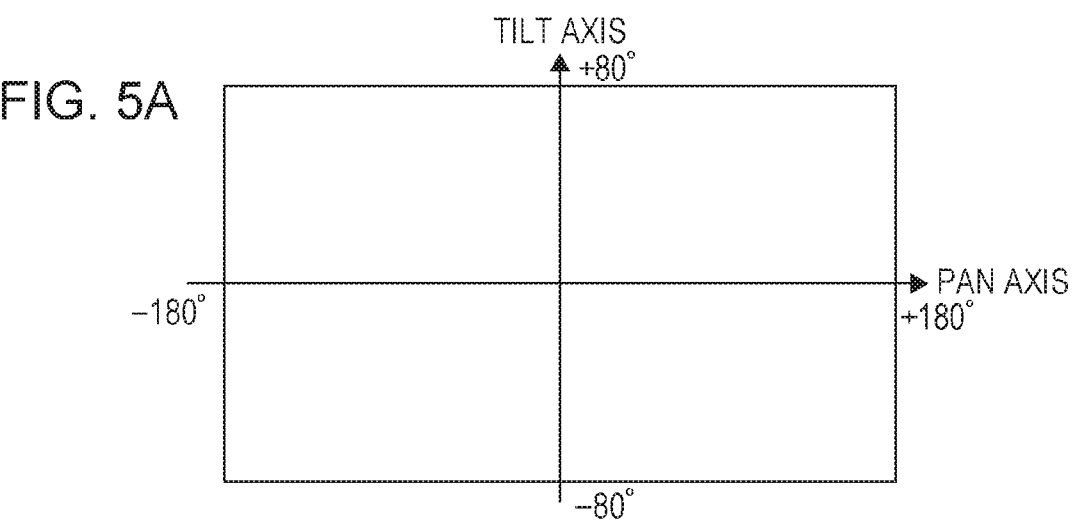
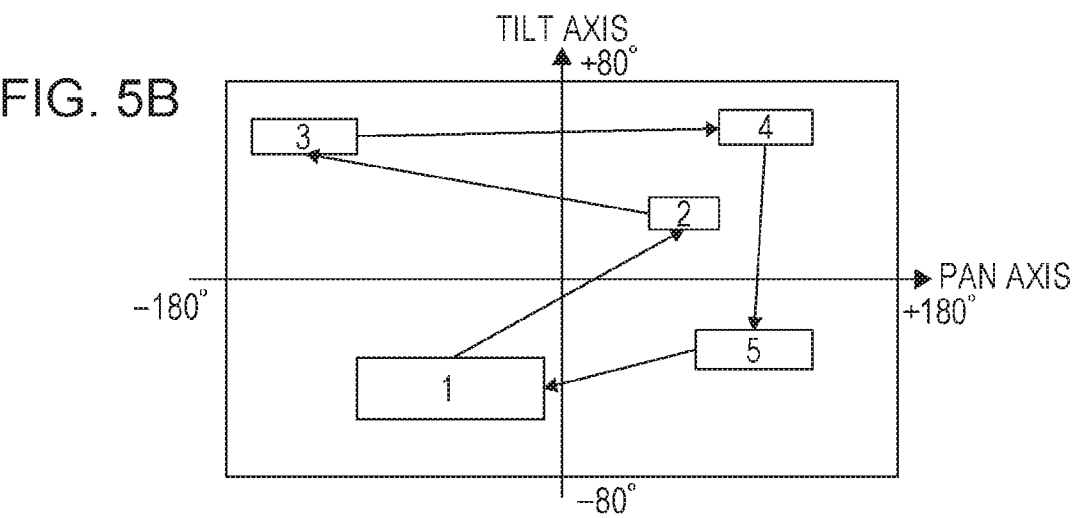
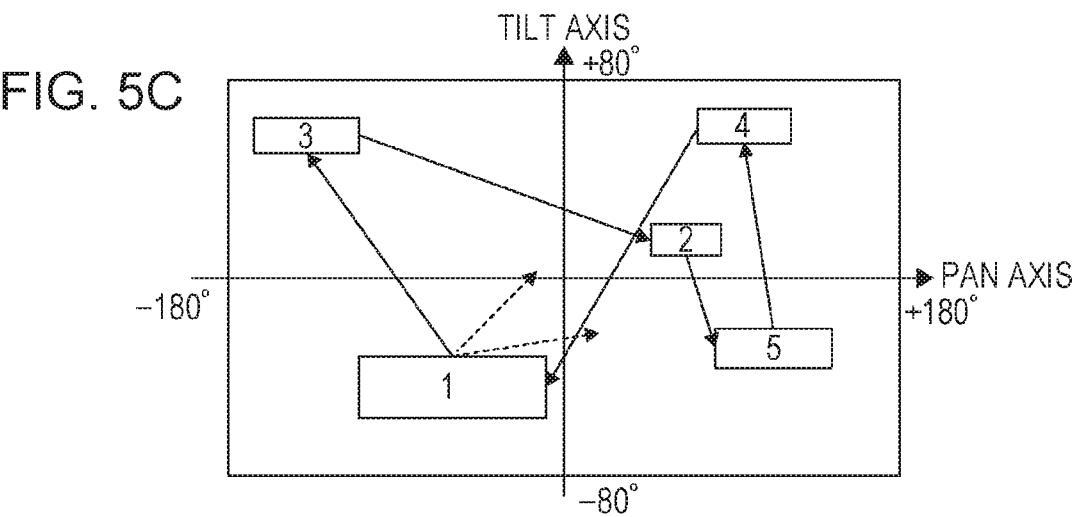

FIG. 7A

```
<xs:element name="GetNodes">
    <xs:complexType />
</xs:element>
```

FIG. 7B

```
<xs:element name="GetNodesResponse">
    <xs:complexType>
      <xs:sequence>
        <xs:element name="PTZNode" type="tt:PTZNode" minOccurs="0" maxOccurs="unbounded" />
      </xs:sequence>
    </xs:complexType>
</xs:element>
```

FIG. 7C

```
<xs:element name="GetNode">
    <xs:complexType>
      <xs:sequence>
        <xs:element name="NodeToken" type="tt:ReferenceToken" />
      </xs:sequence>
    </xs:complexType>
</xs:element>
```

FIG. 7D

```
<xs:element name="GetNodeResponse">
    <xs:complexType>
      <xs:sequence>
        <xs:element name="PTZNode" type="tt:PTZNode" />
      </xs:sequence>
    </xs:complexType>
</xs:element>
```

FIG. 7E

```
<xs:complexType name="PTZNode">
   <xs:complexContent>
    <xs:extension base="tt:DeviceEntity">
      <xs:sequence>
        <xs:element name="Name" type="tt:Name" minOccurs="0"/>
        <xs:element name="SupportedPTZSpaces" type="tt:PTZSpaces"/>
        <xs:element name="MaximumNumberOfPresets" type="xs:int"/>
        <xs:element name="HomeSupported" type="xs:boolean"/>
        <xs:element name="AuxiliaryCommands" type="tt:AuxiliaryData" minOccurs="0" maxOccurs="unbounded"/>
        <xs:element name="Extension" type="tt:PTZNodeExtension" minOccurs="0" />
      </xs:sequence>
      <xs:attribute name="FixedHomePosition" type="xs:boolean"/>
    </xs:extension>
   </xs:complexContent>
</xs:complexType>
```

FIG. 7F

```
<xs:complexType name="PTZNodeExtension">
    <xs:sequence>
        <xs:element name="SupportedPresetTour" type="tt:PTZPresetTourSupported" />
        <xs:element name="Extension" type="tt:PTZNodeExtension2" minOccurs="0" />
    </xs:sequence>
</xs:complexType>
```

FIG. 7G

```
<xs:complexType name="PTZPresetTourSupported">
    <xs:sequence>
        <xs:element name="MaximumNumberOfPresetTours" type="xs:int" />
        <xs:element name="PTZPresetTourOperation" type="tt:PTZPresetTourOperation" minOccurs="0"
                maxOccurs="unbounded" />
        <xs:element name="Extension" type="tt:PTZPresetTourSupportedExtension" minOccurs="0" />
    </xs:sequence>
</xs:complexType>
```

FIG. 7H

```
<xs:simpleType name="PTZPresetTourOperation">
    <xs:restriction base="xs:string">
        <xs:enumeration value="Start" />
        <xs:enumeration value="Stop" />
        <xs:enumeration value="Pause" />
        <xs:enumeration value="Extended" />
    </xs:restriction>
</xs:simpleType>
```

FIG. 8A

```
<xs:element name="ModifyPresetTour">
    <xs:complexType>
      <xs:sequence>
        <xs:element name="ProfileToken" type="tt:ReferenceToken" />
        <xs:element name="PresetTour" type="tt:PresetTour" />
      </xs:sequence>
    </xs:complexType>
</xs:element>
```

FIG. 8B

```
<xs:complexType name="PresetTour">
   <xs:sequence>
     <xs:element name="Name" type="tt:Name" minOccurs="0" />
     <xs:element name="Status" type="tt:PTZPresetTourStatus" />
     <xs:element name="AutoStart" type="xs:boolean" />
     <xs:element name="StartingCondition" type="tt:PTZPresetTourStartingCondition" />
     <xs:element name="TourSpot" type="tt:PTZPresetTourSpot" minOccurs="0" maxOccurs="unbounded" />
     <xs:element name="Extension" type="tt:PTZPresetTourExtension" minOccurs="0" />
   </xs:sequence>
   <xs:attribute name="token" type="tt:ReferenceToken" />
</xs:complexType>
```

FIG. 8C

```
<xs:complexType name="PTZPresetTourStatus">
   <xs:sequence>
     <xs:element name="State" type="tt:PTZPresetTourState" />
     <xs:element name="CurrentTourSpot" type="tt:PTZPresetTourSpot" minOccurs="0" />
     <xs:element name="Extension" type="tt:PTZPresetTourStatusExtension" minOccurs="0" />
   </xs:sequence>
</xs:complexType>
```

FIG. 8D

```
<xs:simpleType name="PTZPresetTourState">
   <xs:restriction base="xs:string">
     <xs:enumeration value="Idle" />
     <xs:enumeration value="Touring" />
     <xs:enumeration value="Paused" />
     <xs:enumeration value="Extended" />
   </xs:restriction>
</xs:simpleType>
```

FIG. 8E

```
<xs:complexType name="PTZPresetTourStartingCondition">
   <xs:sequence>
     <xs:element name="RecurringTime" type="xs:int" minOccurs="0" />
     <xs:element name="RecurringDuration" type="xs:duration" minOccurs="0" />
     <xs:element name="Direction" type="tt:PTZPresetTourDirection" minOccurs="0" />
     <xs:element name="Extension" type="tt:PTZPresetTourStartingConditionExtension" minOccurs="0" />
   </xs:sequence>
</xs:complexType>
```

FIG. 8F
```
<xs:complexType name="PTZPresetTourSpot">
    <xs:sequence>
      <xs:element name="PresetDetail" type="tt:PTZPresetTourPresetDetail" />
      <xs:element name="Speed" type="tt:PTZSpeed" minOccurs="0" />
      <xs:element name="StayTime" type="xs:duration" minOccurs="0" />
      <xs:element name="Extension" type="tt:PTZPresetTourSpotExtension" minOccurs="0" />
    </xs:sequence>
</xs:complexType>
```

FIG. 8G
```
<xs:complexType name="PTZPresetTourPresetDetail">
    <xs:sequence>
     <xs:choice>
       <xs:element name="PresetToken" type="tt:ReferenceToken" />
       <xs:element name="Home" type="xs:boolean" />
       <xs:element name="PTZPosition" type="tt:PTZVector" />
       <xs:element name="TypeExtension" type="tt:PTZPresetTourTypeExtension" />
     </xs:choice>
    </xs:sequence>
</xs:complexType>
```

FIG. 8H
```
<xs:complexType name="PTZPresetTourSpotExtension">
    <xs:sequence>
       <xs:element name="RandomOrder" type="xs:boolean" minOccurs="0" />
       <xs:element name="RandomSpeed" type="xs:boolean" minOccurs="0" />
       <xs:element name="RandomStayTime" type="xs:boolean" minOccurs="0" />
       <xs:element name="RandomTrack" type="xs:boolean" minOccurs="0" />
       <xs:element name="Extension" type="tt:PTZPresetTourSpotExtension2" minOccurs="0"/>
    </xs:sequence>
</xs:complexType>
```

FIG. 8I
```
<xs:complexType name="PTZSpeed">
            <xs:sequence>
                    <xs:element name="PanTilt" type="tt:Vector2D" minOccurs="0" />
                    <xs:element name="Zoom" type="tt:Vector1D" minOccurs="0" />
            </xs:sequence>
</xs:complexType>
```

FIG. 8J
```
<xs:complexType name="PTZPresetTourStartingConditionExtension">
    <xs:sequence>
      <xs:element name="RandomRecurringDuration" type="xs:boolean" minOccurs="0" />
      <xs:element name="RandomDirection" type="xs:boolean" minOccurs="0" />
      <xs:element name="Extension" type="tt:PTZPresetTourStartingConditionExtension2" minOccurs="0"/>
    </xs:sequence>
</xs:complexType>
```

FIG. 9A
```
<xs:element name="GetPresetTourOptions">
    <xs:complexType>
     <xs:sequence>
       <xs:element name="ProfileToken" type="tt:ReferenceToken" />
       <xs:element name="PresetTourToken" type="tt:ReferenceToken" minOccurs="0" />
     </xs:sequence>
    </xs:complexType>
</xs:element>
```

FIG. 9B
```
<xs:element name="GetPresetTourOptionsResponse">
    <xs:complexType>
     <xs:sequence>
       <xs:element name="Options" type="tt:PTZPresetTourOptions" />
     </xs:sequence>
    </xs:complexType>
</xs:element>
```

FIG. 9C
```
<xs:complexType name="PTZPresetTourOptions">
   <xs:sequence>
    <xs:element name="AutoStart" type="xs:boolean" />
    <xs:element name="StartingCondition" type="tt:PTZPresetTourStartingConditionOptions" />
    <xs:element name="TourSpot" type="tt:PTZPresetTourSpotOptions2" />
   </xs:sequence>
  </xs:complexType>
```

FIG. 9D
```
<xs:complexType name="PTZPresetTourStartingConditionOptions">
   <xs:sequence>
    <xs:element name="RecurringTime" type="tt:IntRange" minOccurs="0" />
    <xs:element name="RecurringDuration" type="tt:DurationRange" minOccurs="0" />
    <xs:element name="Direction" type="tt:PTZPresetTourDirection" minOccurs="0" maxOccurs="unbounded" />
    <xs:element name="Extension" type="tt:PTZPresetTourStartingConditionOptionsExtension" minOccurs="0" />
   </xs:sequence>
  </xs:complexType>
```

FIG. 9E
```
<xs:complexType name="PTZPresetTourStartingConditionOptionsExtension">
   <xs:sequence>
      <xs:element name="RandomRecurringDuration" type="xs:boolean" minOccurs="0" />
      <xs:element name="RandomDirection" type="xs:boolean" minOccurs="0" />
      <xs:element name="Extension" type="tt:PTZPresetTourStartingConditionOptionsExtension2" minOccurs="0"/>
   </xs:sequence>
</xs:complexType>
```

FIG. 9F
```
<xs:complexType name="PTZPresetTourSpotOptions2">
    <xs:sequence>
        <xs:element name="PresetDetail" type="tt:PTZPresetTourPresetDetailOptions" />
        <xs:element name="StayTime" type="tt:DurationRange" />
        <xs:element name="Extension" type="tt:PTZPresetTourSpotOptionsExtension" minOccurs="0" />
    </xs:sequence>
</xs:complexType>
```

FIG. 9G
```
<xs:complexType name="PTZPresetTourPresetDetailOptions">
    <xs:sequence>
        <xs:element name="PresetToken" type="tt:ReferenceToken" minOccurs="0" maxOccurs="unbounded" />
        <xs:element name="Home" type="xs:boolean" minOccurs="0" />
        <xs:element name="PanTiltPositionSpace" type="tt:Space2DDescription" minOccurs="0" />
        <xs:element name="ZoomPositionSpace" type="tt:Space1DDescription" minOccurs="0" />
        <xs:element name="Extension" type="tt:PTZPresetTourPresetDetailOptionsExtension" minOccurs="0" />
    </xs:sequence>
</xs:complexType>
```

FIG. 9H
```
<xs:complexType name="DurationRange">
    <xs:sequence>
        <xs:element name="Min" type="xs:duration" />
        <xs:element name="Max" type="xs:duration" />
    </xs:sequence>
</xs:complexType>
```

FIG. 9I
```
<xs:complexType name="PTZPresetTourSpotOptionsExtension">
    <xs:sequence>
        <xs:element name="RandomOrder" type="xs:boolean" minOccurs="0" />
        <xs:element name="RandomSpeed" type="xs:boolean" minOccurs="0" />
        <xs:element name="RandomStayTime" type="xs:boolean" minOccurs="0" />
        <xs:element name="RandomTrack" type="xs:boolean" minOccurs="0" />
        <xs:element name="Extension" type="tt:PTZPresetTourSpotOptionsExtension2" minOccurs="0"/>
    </xs:sequence>
</xs:complexType>
```

FIG. 11A

```
<?xml version="1.0" encoding="UTF-8" ?>
 <SOAP-ENV:Envelope
    . . . . . .
    xmlns:tt="http://www.onvif.org/ver10/schema"
    xmlns:tptz="http://www.onvif.org/ver20/ptz/wsdl">
 <SOAP-ENV:Header>
    . . . . . .
 </SOAP-ENV:Header>
 <SOAP-ENV:Body>
    <tptz:GetPresetTourOptions>
       <tt:ProfileToken>H264_01</tt:ProfileToken>
       <tt:PresetTourToken>RandomTour_01</tt:PresetTourToken>
    </tptz:GetOSDresetTourOptions>
 </SOAP-ENV:Body>
</SOAP-ENV:Envelope>
```

FIG. 11B

```xml
<?xml version="1.0" encoding="UTF-8" ?>
<SOAP-ENV:Envelope
 . . . . . .
    xmlns:tt="http://www.onvif.org/ver10/schema"
    xmlns:tptz="http://www.onvif.org/ver20/ptz/wsdl">
 <SOAP-ENV:Header>
 . . . . . .
 </SOAP-ENV:Header>
 <SOAP-ENV:Body>
  <tptz:GetPresetTourOptionsResponse>
    <tptz:Options>
    . . . . . .
      <tt:StartingCondition>
        <tt:RecurringTime>
        . . . . . .
        </tt:Direction>
        <tt:Extension>
            <tt:RandomRecurringDuration>False</tt:RandomRecurringDuration>
            <tt:RandomDirection>True</tt:RandomDirection>
        </tt:Extension>
      </tt:StartingCondition>
      <tt:TourSpot>
        <tt:PresetDetail>
        . . . . . .
        </tt:StayTime>
        <tt:Extension>
            <tt:RandomOrder>True</tt:RandomOrder>
            <tt:RandomSpeed>True</tt:RandomSpeed>
            <tt:RandomStayTime>True</tt:RandomStayTime>
            <tt:RandomTrack>False</tt:RandomTrack>
        </tt:Extension>
      </tt:TourSpot>
    </tptz:Options>
  </tptz:GetPresetTourOptionsResponse>
 </SOAP-ENV:Body>
</SOAP-ENV:Envelope>
```

FIG. 12A

```
<xs:complexType name="PTZPresetTourStartingConditionExtension">
  <xs:sequence>
    <xs:element name="ExtendedRecurringDuration" type="tt:PTZPresetTourRecurringDurationExtended" minOccurs="0" />
    <xs:element name="ExtendedDirection" type="tt:PTZPresetTourDirectionExtended" minOccurs="0" />
    <xs:element name="Extension" type="tt:PTZPresetTourStartingConditionExtension2" minOccurs="0"/>
  </xs:sequence>
</xs:complexType>
```

FIG. 12B

```
<xs:simpleType name="PTZPresetTourRecurringDurationExtended">
  <xs:restriction base="xs:string">
    <xs:enumeration value="Random" />
    <xs:enumeration value="Extended" />
  </xs:sequence>
</xs:simpleType>
```

FIG. 12C

```
<xs:simpleType name="PTZPresetTourDirectionExtended">
  <xs:restriction base="xs:string">
    <xs:enumeration value="Random" />
    <xs:enumeration value="Extended" />
  </xs:sequence>
</xs:simpleType>
```

FIG. 13A

```
<xs:complexType name="PTZPresetTourStartingCondition">
    <xs:sequence>
        <xs:element name="RecurringTime" type="xs:int" minOccurs="0" />
        <xs:element name="RecurringDuration" type="xs:duration" minOccurs="0" />
        <xs:element name="Direction" type="tt:PTZPresetTourDirection" minOccurs="0" />
        <xs:element name="Extension" type="tt:PTZPresetTourStartingConditionExtension" minOccurs="0" />
    </xs:sequence>
    <xs:attribute name="ExtendedRecurringDuration" type="tt:string" />
    <xs:attribute name="ExtendedDirection" type="tt:string" />
</xs:complexType>
```

FIG. 13B

```
<xs:complexType name="PTZPresetTourStartingCondition">
    <xs:sequence>
        <xs:element name="RecurringTime" type="xs:int" minOccurs="0" />
        <xs:element name="RecurringDuration" type="xs:duration" minOccurs="0" />
        <xs:element name="Direction" type="tt:PTZPresetTourDirection" minOccurs="0" />
        <xs:element name="Extension" type="tt:PTZPresetTourStartingConditionExtension" minOccurs="0" />
    </xs:sequence>
    <xs:attribute name="RandomRecurringDuration" type="tt:boolean" />
    <xs:attribute name="RandomDirection" type="tt:boolean" />
</xs:complexType>
```

EXTERNAL DEVICE CONTROL METHOD, IMAGING DEVICE CONTROL METHOD, IMAGING SYSTEM CONTROL METHOD, EXTERNAL DEVICE, IMAGING DEVICE, AND IMAGING SYSTEM

TECHNICAL FIELD

The present invention relates to an external device control method, an imaging device control method, an imaging system control method, an external device, an imaging device, and an imaging system, and more particularly, is suitably used for a case where an imaging unit is caused to perform a tour operation to capture images.

BACKGROUND ART

A function of surveillance cameras has been known which performs a so-called "preset tour", in which surveillance is carried out by performing a tour operation of a plurality of photographing points. Furthermore, a surveillance system has been known in which an external surveillance control device generates, in a random manner, the photographing order of photographing points, the moving speeds of movement between the photographing points, photographing times at the photographing points, or the like for the preset tour.

A surveillance camera device is disclosed in PTL 1. In the surveillance camera device, a plurality of photographing positions are preset in advance, and an external control device generates, in a random manner, the photographing order of the preset positions, a movement path of movement between the preset positions, the stay times at the preset positions, and the like for a tour operation of the preset positions. Then, the external control device transmits a control instruction to an imaging device.

The surveillance camera device disclosed in PTL 1 is configured such that the control device, which is provided outside a camera, controls a random operation for a preset tour. Under such circumstances, a surveillance camera which is configured to generate a random preset tour operation and control its own operation, has been considered. In the case of such a surveillance camera, it is assumed that an operation which needs to be performed in a random manner in the preset tour may be realized by setting by an external client device.

In view of the above assumption, surveillance cameras of two different capabilities are available in the market: surveillance cameras, such as the surveillance camera device disclosed in PTL 1, that are set, by an external device, to perform a random operation in a preset tour; and surveillance cameras that are capable of performing a random preset tour operation.

In the latter case, there is a problem that it is difficult for a user to externally determine whether or not a target surveillance camera is capable of performing a random operation. In addition, in order to determine whether or not the target surveillance camera is capable of performing a random operation, the user needs to actually try a random operation to determine whether a random operation can be performed. Such operations are complicated.

CITATION LIST

Patent Literature

PTL 1: Japanese Patent Laid-Open No. 2006-311309

SUMMARY OF INVENTION

The present invention provides an external device control method, an imaging device control method, an imaging system control method, an external device, an imaging device, and an imaging system that allow a user to easily determine whether a random operation can be performed in a preset tour operation of a surveillance camera and therefore improve user's operability.

According to an embodiment of the present invention, a method for controlling an external device configured to be capable of communicating, via a network, with an imaging device configured to include an imaging unit configured to capture an image of an object, includes a transmitting step of transmitting to the imaging device an instruction for making an inquiry about capability regarding a random operation when causing the imaging unit to perform a tour operation of a plurality of imaging positions, a receiving step of receiving capability information indicating the capability regarding the random operation, an a changing step of changing contents to be displayed on a display unit, in accordance with the capability information received in the receiving step.

Further features of the present invention will become apparent from the following description of exemplary embodiments with reference to the attached drawings.

BRIEF DESCRIPTION OF DRAWINGS

FIG. 5A illustrates a tour operation of a preset tour.

FIG. 5B illustrates a tour operation of a preset tour.

FIG. 5C illustrates a tour operation of a preset tour.

FIG. 7A illustrates a data structure regarding a GetNodes command and a GetNode command FIG. 7B illustrates a data structure regarding a GetNodes command and a GetNode command FIG. 7C illustrates a data structure regarding a GetNodes command and a GetNode command FIG. 7D illustrates a data structure regarding a GetNodes command and a GetNode command FIG. 7E illustrates a data structure regarding a GetNodes command and a GetNode command FIG. 7F illustrates a data structure regarding a GetNodes command and a GetNode command FIG. 7G illustrates a data structure regarding a GetNodes command and a GetNode command FIG. 7H illustrates a data structure regarding a GetNodes command and a GetNode command FIG. 8A illustrates a ModifyPresetTour command according to a first embodiment and a data structure regarding the ModifyPresetTour command FIG. 8B illustrates a ModifyPresetTour command according to a first embodiment and a data structure regarding the ModifyPresetTour command FIG. 8C illustrates a ModifyPresetTour command according to a first embodiment and a data structure regarding the ModifyPresetTour command FIG. 8D illustrates a ModifyPresetTour command according to a first embodiment and a data structure regarding the ModifyPresetTour command FIG. 8E illustrates a ModifyPresetTour command according to a first embodiment and a data structure regarding the ModifyPresetTour command FIG. 8F illustrates a ModifyPresetTour command according to a first embodiment and a data structure regarding the ModifyPresetTour command FIG. 8G illustrates a ModifyPresetTour command according to a first embodiment and a data structure regarding the ModifyPresetTour command FIG. 8H illustrates a ModifyPresetTour command according to a first embodiment and a data structure regarding the ModifyPresetTour command FIG. 8I illustrates a ModifyPresetTour command according to a first embodiment and a data structure regarding the ModifyPresetTour command FIG. 8J illustrates a ModifyPresetTour command according to a first embodiment and a data structure regarding the ModifyPresetTour command FIG. 9A illustrates a GetPresetTourOptions command according to the first embodiment and a data structure regarding the GetPresetTourOptions command.

FIG. 9B illustrates a GetPresetTourOptions command according to the first embodiment and a data structure regarding the GetPresetTourOptions command.

FIG. 9C illustrates a GetPresetTourOptions command according to the first embodiment and a data structure regarding the GetPresetTourOptions command.

FIG. 9D illustrates a GetPresetTourOptions command according to the first embodiment and a data structure regarding the GetPresetTourOptions command.

FIG. 9E illustrates a GetPresetTourOptions command according to the first embodiment and a data structure regarding the GetPresetTourOptions command.

FIG. 9F illustrates a GetPresetTourOptions command according to the first embodiment and a data structure regarding the GetPresetTourOptions command.

FIG. 9G illustrates a GetPresetTourOptions command according to the first embodiment and a data structure regarding the GetPresetTourOptions command.

FIG. 9H illustrates a GetPresetTourOptions command according to the first embodiment and a data structure regarding the GetPresetTourOptions command.

FIG. 9I illustrates a GetPresetTourOptions command according to the first embodiment and a data structure regarding the GetPresetTourOptions command.

FIG. 11A illustrates a specific configuration example of a GetPresetTourOptions command and a GetPresetTourOptionsReseponse according to the first embodiment.

FIG. 11B illustrates a specific configuration example of a GetPresetTourOptions command and a GetPresetTourOptionsReseponse according to the first embodiment.

FIG. 12A illustrates a configuration example of a PTZ-PresetTourStartingConditionExtension type according to a second embodiment.

FIG. 12B illustrates a configuration example of a PTZ-PresetTourStartingConditionExtension type according to a second embodiment.

FIG. 12C illustrates a configuration example of a PTZ-PresetTourStartingConditionExtension type according to a second embodiment.

FIG. 13A illustrates a configuration example of a PTZ-PresetTourStartingConditionExtension type according to a third embodiment.

FIG. 13B illustrates a configuration example of a PTZ-PresetTourStartingConditionExtension type according to a third embodiment.

DESCRIPTION OF EMBODIMENTS

First Embodiment

Figure 1:
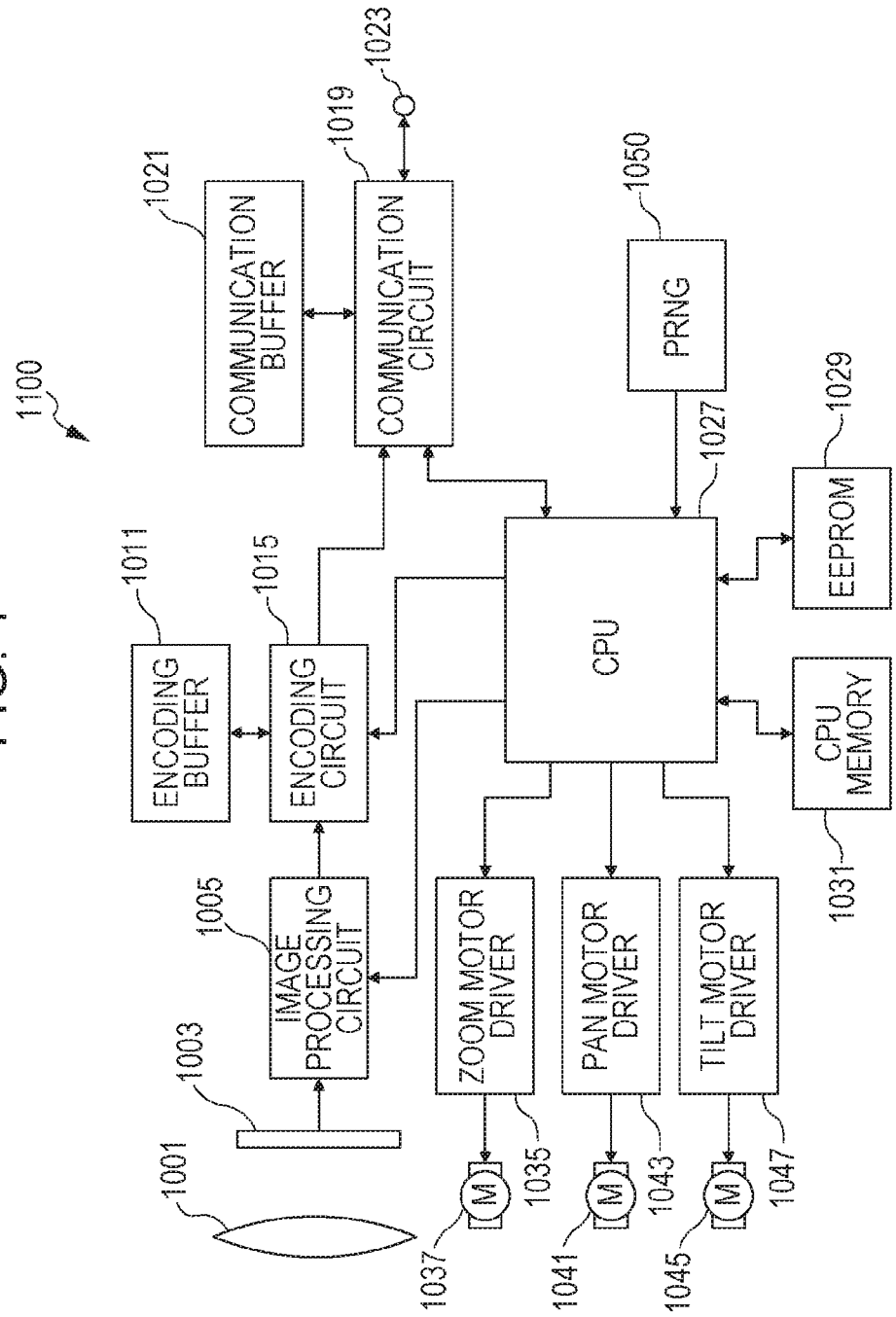
FIG. 1 is a block diagram illustrating a configuration of a surveillance camera.

FIG. 1 is a block diagram illustrating a configuration of a surveillance camera 1100 as an imaging device according to a first embodiment. Referring to FIG. 1, reference numeral 1001 denotes an imaging optical system, reference numeral 1003 denotes an imaging element, and reference numeral 1005 denotes an image processing circuit. Further, reference numeral 1011 denotes an encoding buffer, reference numeral 1015 denotes an encoding circuit, reference numeral 1019 denotes a communication circuit (hereinafter, may be referred to as an interface (IF) circuit), reference numeral 1021 denotes a communication buffer, and reference numeral 1023 denotes a communication port.

Reference numeral 1027 denotes a central arithmetic processing unit (hereinafter, may be referred to as a CPU), reference numeral 1029 denotes an electrically erasable, programmable read-only memory (hereinafter, may be referred to as an EEPROM), and reference numeral 1031 denotes a CPU memory.

Reference numeral 1035 denotes a zoom motor driver, reference numeral 1037 denotes a zoom motor, reference numeral 1041 denotes a pan motor, and reference numeral 1043 denotes a pan motor driver. Further, reference numeral 1045 denotes a tilt motor, reference numeral 1047 denotes a tilt motor driver, and reference numeral 1050 denotes a pseudorandom number generator (hereinafter, may be referred to as a PRNG).

An operation of the surveillance camera 1100 according to the first embodiment will be explained below with reference to FIG. 1. Beams of light from an object whose image is to be captured is incident to the imaging element 1003 through the imaging optical system 1001, and photoelectric conversion of the light is performed. The imaging element 1003 used in the first embodiment includes a charge-coupled device (CCD), a complementary metal-oxide semiconductor (CMOS) device, or the like. The imaging element 1003 used in the first embodiment corresponds to an imaging unit which captures an image of an object whose image is formed by the imaging optical system 1001 and which outputs the captured image as an image signal.

On an image which has been processed appropriately by the image processing circuit 1005, encoding processing, such as motion JPEG encoding, H.264 encoding, or H.265 encoding, is performed by the encoding circuit 1015. In the encoding processing, the encoding buffer 1011 is used for temporarily storing an original image, intermediate data for encoding, encoded data, and the like.

Reference numeral 1019 denotes a communication circuit which performs reception of an externally transmitted command, transmission of a response to the received command, transfer of an image encoded by the encoding circuit 1015 to the outside, and the like. The above-mentioned command, response, and image to be delivered to the outside are temporarily stored in the communication buffer 1021. The above-mentioned command is received via the communication port 1023, and the abovementioned response and encoded image are transmitted to the outside via the communication port 1023.

The communication circuit 1019 receives, for example, a zoom instruction command for varying the focal length of the imaging optical system 1001 mounted on the surveillance camera 1100 according to the first embodiment. The command is input to the CPU 1027 from the communication circuit 1019, and the contents of the input command are interpreted by the CPU 1027.

The CPU 1027 issues an instruction to the zoom motor driver 1035 in accordance with the interpreted contents, and operates the zoom motor 1037. When the zoom motor 1037 operates, a zoom lens group located inside the imaging optical system 1001 move. By this operation, the surveillance camera 1100 according to the first embodiment is able to control the focal length of the imaging optical system 1001 in accordance with an external zoom instruction command Furthermore, the communication circuit 1019 receives, for example, a pan instruction command for performing a pan operation for a platform, which is not illustrated, mounted on the surveillance camera 1100 according to the first embodiment. The CPU 1027 issues an instruction to the pan motor driver 1043 in accordance with the instruction contents of the command received by the communication circuit 1019, and operates the pan motor 1041.

By this operation, the surveillance camera 1100 according to the first embodiment is able to control a pan operation for a platform, which is not illustrated, in accordance with an external pan instruction command Furthermore, the communication circuit 1019 receives, for example, a tilt instruction command for performing a tilt operation for a platform, which is not illustrated, mounted on the surveillance camera 1100 according to the first embodiment. The CPU 1027 issues an instruction to the tilt motor driver 1047 in accordance with instruction contents of the command received by the communication circuit 1019, and operates the tilt motor 1045.

By this operation, the surveillance camera 1100 according to the first embodiment is able to control a tilt operation for a platform, which is not illustrated, in accordance with an external tilt instruction command In the first embodiment, the zoom motor 1037, the pan motor 104, and the tilt motor 1045 are, for example, step motors. Therefore, when the CPU 1027 counts the number of driving pulses output from the zoom motor driver 1035, the pan motor driver 1043, and the tilt motor driver 1047, open-loop control can be achieved.

In the first embodiment, the zoom motor 1037, the pan motor 104, and the tilt motor 1045 correspond to a tour unit which causes the imaging optical system 1001, the imaging element 1003, and the like to perform a tour operation of a plurality of imaging positions.

A preset setting command for storing a photographing direction in which the surveillance camera 1100 should perform photographing and zoom information for photographing is input to the communication circuit 1019 via the communication port 1023. The preset setting command is interpreted by the CPU 1027. The interpreted data is called preset settings. The preset settings are stored in the CPU memory 1031. When power supply is disconnected, the preset settings are stored in the EEPROM 1029. The CPU memory 1031 and the EEPROM 1029 are able to store a plurality of preset settings.

A setting command for a preset tour is input to the communication circuit 1019 via the communication port 1023. The setting command for a preset tour input to the communication circuit 1019 is also interpreted by the CPU 1027, and is stored in the CPU memory 1031 and the EEPROM 1029. Further, the CPU 1027 starts a preset tour operation based on the interpreted setting command for the preset tour.

The PRNG 1050 generates a pseudorandom number. The generated pseudorandom number is input to the CPU 1027 and is used as an operation parameter during a preset tour operation. In the first embodiment, for example, the pseudorandom number is used for the following settings: selection of the next preset setting, a stay time during which the same preset setting is maintained, a movement path of movement from a preset setting to another preset setting, a standby time between a tour and the next tour for the case where a plurality of tour operations are performed, and the like.

In the example described above, pan, tilt, and zoom are configured to implement open-loop control. However, pan, tilt, and zoom may each be configured to implement closed-loop control using individual position sensors, angle sensors, or the like.

In the first embodiment, combinations of positions of pan, tilt, and zoom representing photographing settings performed for the surveillance camera 1100 may be called a preset position, a preset setting, a preset point, a preset point, a tour point, a tour spot, and an imaging position.

Combinations of positions of pan, tilt, and zoom for the case where a platform and a zoom lens group are stationary during a preset tour may also be called a preset position, a preset setting, a preset point, a tour point, a tour spot, and an imaging position.

A configuration of a client device 2100 as an external device in the first embodiment will now be explained with reference to FIG. 2.

Figure 2:
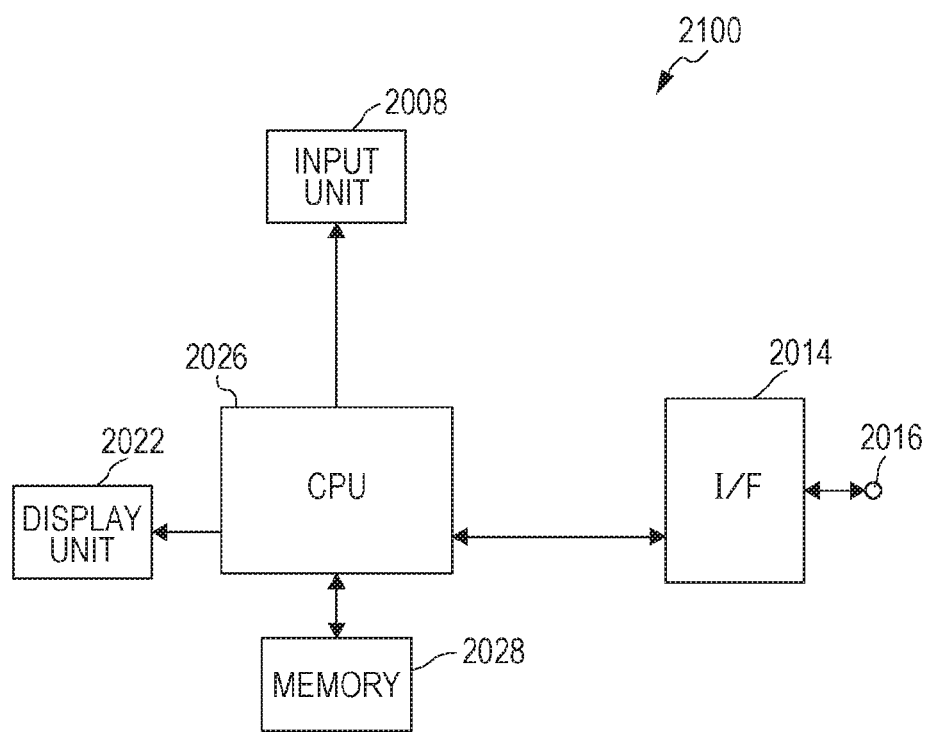
FIG. 2 is a block diagram illustrating a configuration of a client device.

FIG. 2 is a block diagram illustrating a configuration of the client device 2100 according to the first embodiment. Referring to FIG. 2, reference numeral 2008 denotes an input unit, reference numeral 2014 denotes a digital interface unit (hereinafter, may be referred to as an I/F), reference numeral 2016 denotes an interface terminal, reference numeral 2022 denotes a display unit, reference numeral 2026 denotes a central arithmetic processing unit (hereinafter, referred to as a CPU), and reference numeral 2028 denotes a memory.

The client device 2100 illustrated in FIG. 2 is typically a general-purpose computer, such as a personal computer (hereinafter, may be referred to as a PC). A pointing device including, for example, a keyboard and a mouse, is used as the input unit 2008. Further, for example, a liquid crystal display device, a plasma display device, a cathode-ray tube (hereinafter, may be referred to as a CRT) display device, or the like is used as the display unit 2022.

A graphical user interface (may be referred to as a GUI) of the client device 2100 is displayed on the display unit 2022. A user of the client device 2100 operates the GUI of the client device 2100 through the input unit 2008. In the CPU 2026, software for displaying the GUI and detecting a user operation on the input unit 2008 is executed.

Intermediate results of arithmetic operations by the CPU 2026, data values to be referred to later, and the like are temporarily stored in the memory 2028 and are referred to.

In the first embodiment, by the operation mentioned above, operation of the client device 2100 may be implemented.

Figure 3A:
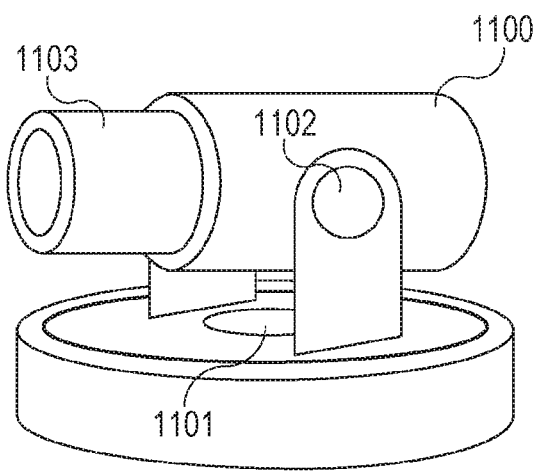
FIG. 3A illustrates a network configuration.

A network configuration according to the first embodiment will be explained below with reference to FIGS. 3A and 3B. Referring to FIG. 3A, reference numeral 1100 denotes the surveillance camera according to the first embodiment. Reference numeral 1101 denotes a mechanism for changing the orientation of a lens in a pan direction, reference numeral 1102 denotes a mechanism for changing the orientation of a lens in a tilt direction, and reference numeral 1103 denotes a zoom mechanism.

Figure 3B:
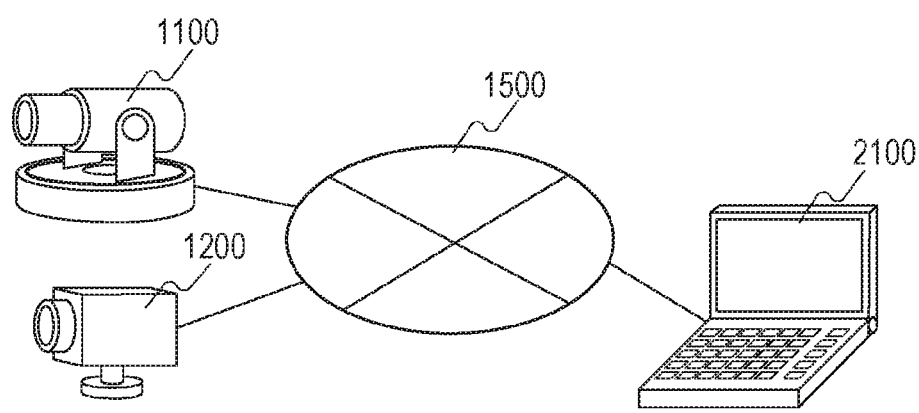
FIG. 3B illustrates a network configuration.

FIG. 3B is a configuration diagram of a system including the surveillance camera 1100. Reference numeral 2100 denotes the client device according to the first embodiment. The surveillance camera 1100 and the client device 2100 are connected via an IP network 1500 so that they are able to communicate with each other. Reference numeral 1200 denotes a box-type security camera.

The surveillance camera 1100 and the client device 2100 according to the first embodiment form an imaging system.

Figure 4A:
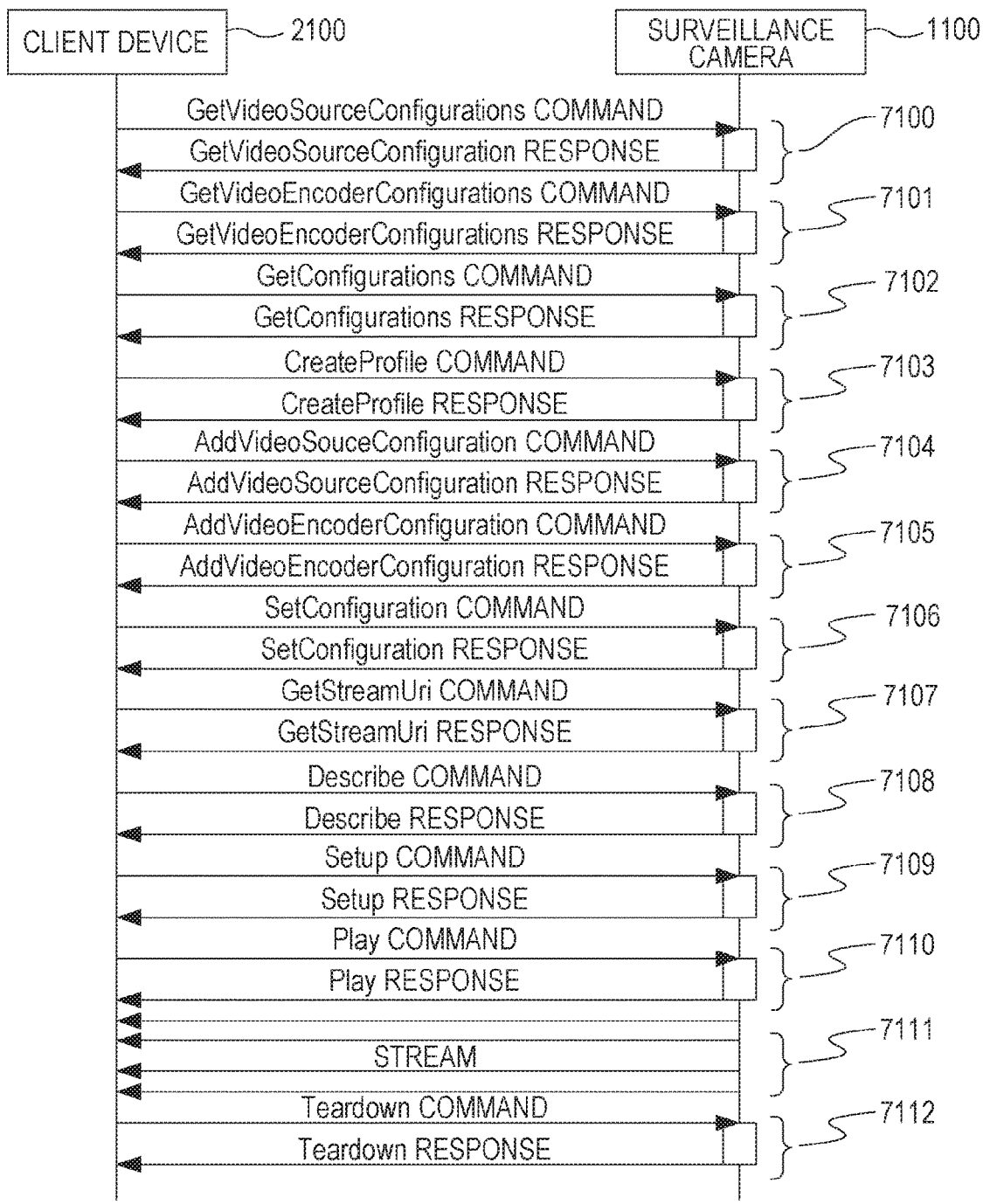
FIG. 4A is a sequence chart illustrating a command transaction.
Figure 4B:
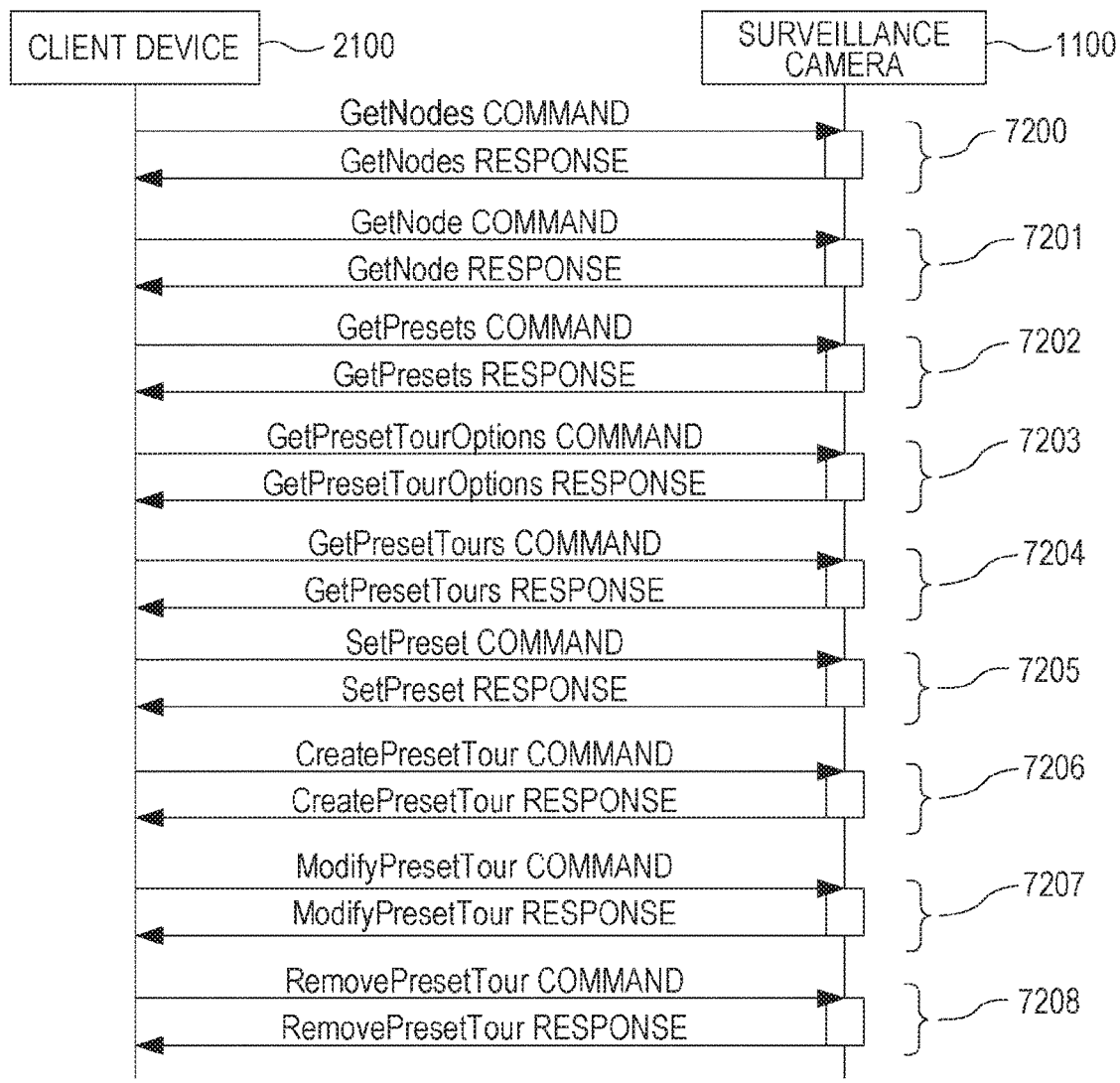
FIG. 4B is a sequence chart illustrating a command transaction.

The client device 2100 transmits to the surveillance camera 1100 various commands, which will be described later, for changing an imaging parameter, driving a platform, starting image streaming, and the like. The surveillance camera 1100 transmits to the client device 2100 responses to the commands and image streaming Command transactions in the first embodiment will be explained below with reference to FIGS. 4A and 4B. FIGS. 4A and 4B are sequence charts illustrating command transactions between the surveillance camera 1100 and the client device 2100.

FIG. 4A illustrates typical command transactions from the start of settings of the surveillance camera 1100 by the client device 2100 to distribution of images by the surveillance camera 1100 and ending of the distribution. Normally, a so-called device discovery operation for searching for the surveillance camera 1100 may be performed by the client device 2100 before starting the command transactions illustrated in FIG. 4A. In the explanation of the first embodiment, however, description of the device discovery operation will be omitted.

Referring to FIG. 4A, reference numeral 7100 denotes a transaction of a GetVideoSourceConfigurations command Based on the command, the client device 2100 acquires a list of VideoSourceConfigurations stored in the surveillance camera 1100. A VideoSourceConfiguration represents data regarding a setting of the imaging element 1003.

Reference numeral 7101 denotes a transaction of a GetVideoEncoderConfigurations command Based on the command, the client device 2100 acquires a list of VideoEncoderConfigurations stored in the surveillance camera 1100.

Reference numeral 7102 denotes a transaction of a GetConfigurations command Based on the command, the client device 2100 acquires a list of PTZConfigurations stored in the surveillance camera 1100. A PTZConfiguration includes a NodeToken for identifying a PTZNode, which will be described later. A PTZNode will be described later with reference to FIG. 4B.

Reference numeral 7103 denotes a transaction of a CreateProfile command Based on the command, the client device 2100 creates a new MediaProfile at the surveillance camera 1100 and acquires a ProfileToken of the created MediaProfile.

Reference numerals 7104, 7105, and 7106 denote transactions of an AddVideoSourceConfiguration command, an Add VideoEncoderConfiguration command, and a SetConfiguration command, respectively.

Based on these commands, the client device 2100 is able to associate a desired MediaProfile with desired VideoSourceConfiguration, VideoEncoderConfiguration, and PTZConfiguration.

Reference numeral 7107 denotes a transaction of a GetStreamUri command Based on the command, the client device 2100 acquires an address (uniform resource identifier (URI)) for acquiring a stream to be distributed from the surveillance camera 1100 in accordance with settings of the desired MediaProfile.

Reference numeral 7108 denotes a transaction of a Describe command By executing the command using the URI acquired by the GetStreamUri command transaction 7107, the client device 2100 requires and acquires information of content stream-distributed from the surveillance camera 1100.

Reference numeral 7109 denotes a transaction of a Setup command. By executing the command using the URI acquired by the GetStreamUri command transaction 7107, a stream transmission method including a session number is shared between the client device 2100 and the surveillance camera 1100.

Reference numeral 7110 denotes a transaction of a Play command By executing the command using the session number acquired by the Setup command transaction 7109, the client device 2100 requires the surveillance camera 1100 to start streaming Reference numeral 7111 denotes a distribution stream. The surveillance camera 1100 performs stream distribution required by the Play command transaction 7110 in the transmission method shared by the Setup command transaction 7109.

Reference numeral 7112 denotes a transaction of a Teardown command By executing the command using the session number acquired by the Setup command transaction 7109, the client device 2100 requires the surveillance camera 1100 to stop streaming As described above, the client device 2100 according to the first embodiment acquires a ProfileToken of a MediaProfile in accordance with a transaction of a CreateProfile command. In this case, the client device 2100 uses a CreateProfile command However, the client device 2100 may be configured to acquire a ProfileToken of the MediaProfile by a command transaction using a GetProfile command, which is not illustrated in FIG. 4A.

A command transaction of a preset tour setting according to the first embodiment will be explained below with reference to FIG. 4B. FIG. 4B is a sequence chart illustrating an example of typical command transactions regarding a preset tour setting for the surveillance camera 1100 and the client device 2100.

Referring to FIG. 4B, reference numeral 7200 denotes a transaction of a GetNodes command. The GetNodes command is a command for acquiring information of all the PTZNodes held by the surveillance camera 1100 according to the first embodiment.

PTZnodes are data including information of methods for designating operations regarding pan, tilt, and zoom allowable by the surveillance camera 1100, the maximum number of presets that can be set, presence or absence of a home position, support or non-support of a preset tour, and the like. Further, the surveillance camera 1100 creates a list of information of all the PTZnodes, and transmits a GetNodes response including the list to the client device 2100 as a response to the GetNodes command.

The PTZnode used in the first embodiment corresponds to tour capability information indicating whether or not the imaging optical system 1001, the imaging element 1003, and the like are able to be caused to automatically perform a tour operation of a plurality of imaging positions.

Reference numeral 7201 denotes a transaction of a GetNode command. The GetNode command is a command for designating the above-mentioned NodeToken and acquiring information of a desired PTZNode. The surveillance camera 1100 transmits information of a single PTZNode to the client device 2100 as a GetNode response to the GetNode command.

Reference numeral 7202 denotes a transaction of a GetPresets command. In response to the GetPresets command, the surveillance camera 1100 creates a list of information of all the presets that have already been set for the surveillance camera 1100, and transmits the list to the client device 2100.

Reference numeral 7203 denotes a transaction of a GetPresetTourOptions command Based on the GetPresetTourOptions command, the client device 2100 acquires capability information of a preset tour held in the surveillance camera 1100.

Based on the acquired preset tour capability information of the surveillance camera 1100, the client device 2100 is able to change the display of a GUI and the like.

The GetPresetTourOptions command used in the first embodiment corresponds to an instruction for making an inquiry about the capability regarding a random operation when causing the imaging optical system 1001, the imaging element 1003, and the like to perform a tour operation of a plurality of imaging positions.

Reference numeral 7204 denotes a transaction of a GetPresetTours command. In response to the GetPresetTours command, the surveillance camera 1100 according to the first embodiment creates a list of information of all the preset tours that have already been set for the surveillance camera 1100, and transmits the list to the client device 2100. Based on the command, the client device 2100 is able to acquire setting information of preset tours that have already been set and allow the display of the GUI and the like to reflect the setting information.

Reference numeral 7205 denotes a transaction of a SetPreset command. The command is used for the client device 2100 to newly register information regarding a preset into the surveillance camera 1100. The newly registered preset may be used as a surveillance position of a preset tour.

Reference numeral 7206 denotes a transaction of a CreatePresetTour command. The CreatePresetTour command is used for creating a setting of a new preset tour. A ProfileToken for identifying a MediaProfile is designated in the command, and the command including the designated ProfileToken is issued.

The surveillance camera 1100 transmits a CreatePresetTour response including a PresetTourToken to the client device 2100 as a response to the CreatePresetTour command. The PresetTourToken is information for identifying a preset tour created based on the CreatePresetTour command.

Reference numeral 7207 denotes a transaction of a ModifyPresetTour command. The command is a command for changing the setting contents of the preset tour created based on the CreatePresetTour command.

A ProfileToken for identifying a MediaProfile and a PresetTourToken for identifying a preset tour are designated in the ModifyPresetTour command, and the ModifyPresetTour command including the designated ProfileToken and PresetTourToken is issued.

Reference numeral 7208 denotes a transaction of a RemovePresetTour command. The RemovePresetTour command is used for deleting from the surveillance camera 1100 a setting of a preset tour that has already been created based on the CreatePresetTour command.

A tour operation of a preset tour according to the first embodiment will now be explained with reference to FIGS. 5A to 5C. FIG. 5A is a diagram illustrating the maximum range that can be photographed by the surveillance camera 1100 according to the first embodiment using the pan, tilt, and zoom mechanisms. In the first embodiment, the maximum range that can be photographed is called, for example, a photographable coordinate space.

It is assumed that the surveillance camera 1100 is able to rotate the imaging optical system 1001, the imaging element 1003, and the like in a tilt direction within a range from −80 degrees to +80 degrees. In addition, it is assumed that the surveillance camera 1100 is able to rotate the imaging optical system 1001, the imaging element 1003, and the like in a pan direction within a range from −180 degrees to +180 degrees.

In the first embodiment, pan and tilt positions of the surveillance camera 1100 may be represented by coordinate points on the photographable coordinate space. The zoom level of the surveillance camera 1100 may be represented by the size of a superimposed rectangle.

That is, a relatively large rectangle represents that photographing is performed at a relatively short focal length, and a relatively small rectangle represents that photographing is performed at a relatively long focal length. Accordingly, in the first embodiment, setting contents of a preset may be represented by a rectangle on the photographable coordinate space.

FIG. 5B is a diagram schematically illustrating preset information set for the surveillance camera 1100 and a tour order of the preset information. In the example illustrated in FIG. 5B, a fixed tour order is set. That is, a tour operation of preset settings 1 to 5 expressed by rectangles is performed in accordance with the set order.

FIG. 5C is a diagram schematically illustrating a random tour order, which is specific to the first embodiment, using the photographable coordinate space. In FIG. 5C, for example, a tour operation is performed from the preset setting 1 to the preset setting 3 in that order. In the first embodiment, the tour order is not fixed and is determined based on a pseudorandom number generated by the PRNG 1050.

Explanation of Client GUI

A configuration of a GUI of the client device 2100 according to the first embodiment will be described below with reference to FIGS. 6A and 6B.

Figure 6A:
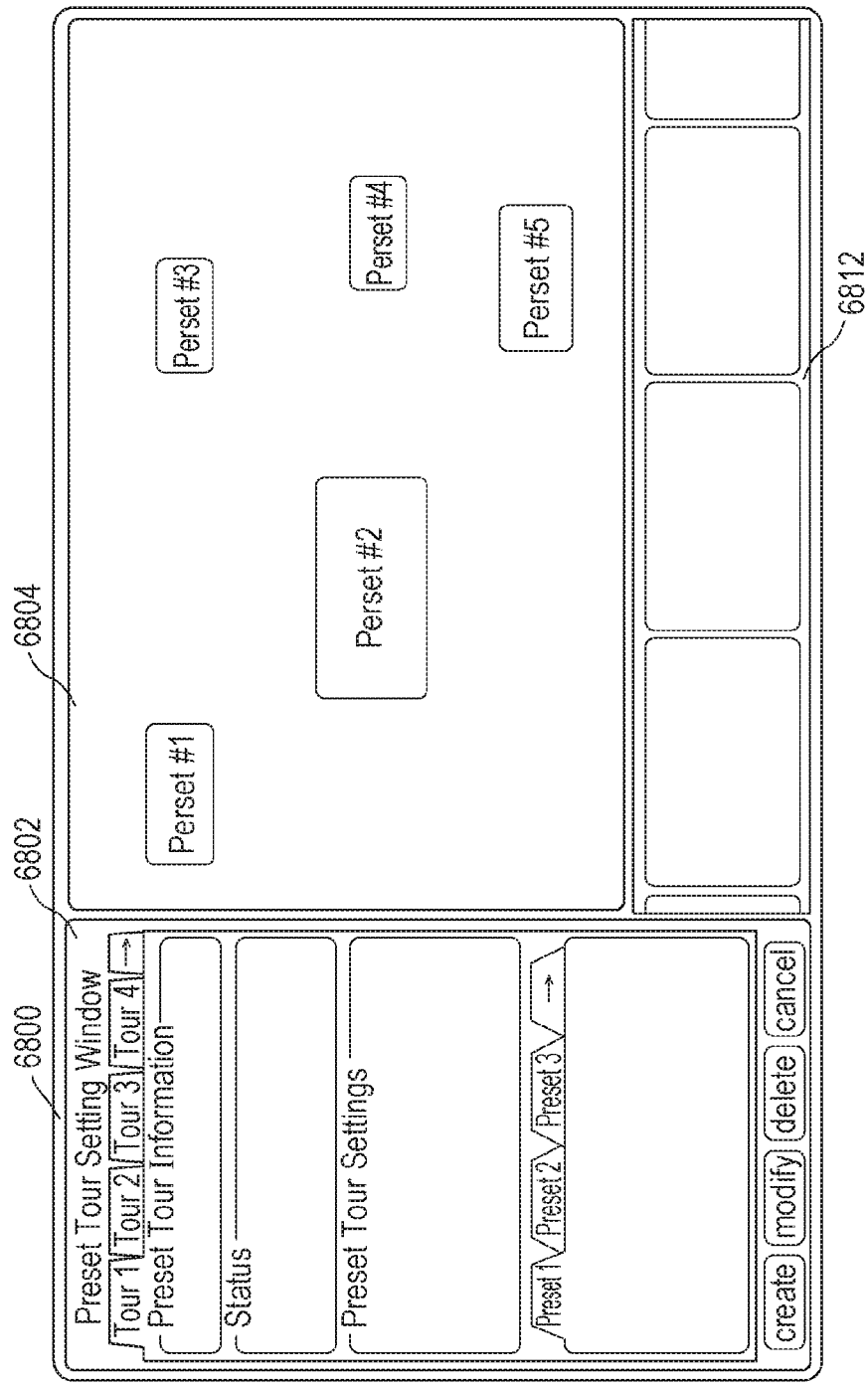
FIG. 6A illustrates a configuration of a graphic user interface in a client device.

Referring to FIG. 6A, reference numeral 6800 denotes a client application window, and reference numeral 6802 denotes a preset tour setting window. Reference numeral 6804 denotes an image stream display window. Reference numeral 6812 denotes an image stream selection window.

With the client device 2100 according to the first embodiment, a user is able to perform setting of a preset tour for the connected surveillance camera 1100 by setting individual items of the preset tour setting window 6802.

In the image stream display window 6804, a stream image selected by the client device 2100 according to the first embodiment is displayed. In the image stream selection window 6812, all the stream images that can be received at the client device 2100 according to the first embodiment can be displayed. The images are displayed in a reduced manner.

With the client device 2100 according to the first embodiment, a user scrolls reduction display windows in the image stream selection window 6812 to the left and right and then selects a desired stream image. Accordingly, the selected image can be displayed in the image stream display window 6804 in a magnified manner.

Figure 6B:
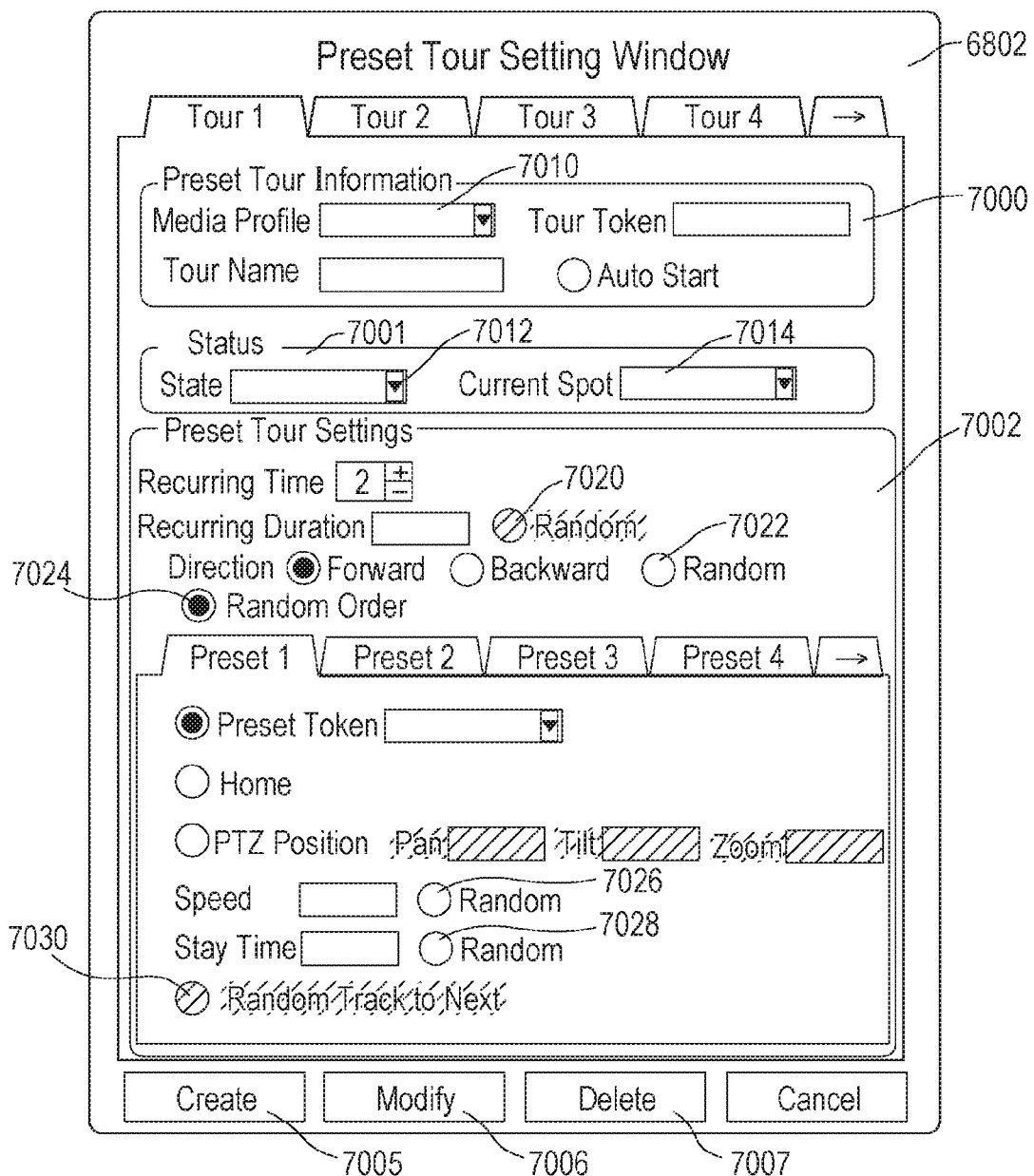
FIG. 6B illustrates a configuration of a graphic user interface in a client device.

FIG. 6B is a diagram for explaining functions of the preset tour setting window 6802. Referring to FIG. 6B, reference numeral 7000 denotes a preset tour information setting frame, reference numeral 7001 denotes a preset tour status display frame, and reference numeral 7002 denotes a preset tour setting frame. Reference numeral 7005 denotes a preset tour creation button, reference numeral 7006 denotes a preset tour update button, and reference numeral 7007 denotes a preset tour delete button.

Reference numeral 7010 denotes a media profile selection box, reference numeral 7012 denotes a preset tour state selection box, and reference numeral 7014 denotes a current tour point selection box. Reference numeral 7020 denotes a Random check box for standby time between tours, reference numeral 7022 denotes a Random check box for a tour direction, reference numeral 7024 denotes a Random check box for a tour order, and reference numeral 7026 denotes a Random check box for a moving speed.

Reference numeral 7028 denotes a Random check box for a stay time at a tour point, and reference numeral 7030 denotes a Random check box for a movement track. In the first embodiment, selecting the Random check box 7022 corresponds to causing the imaging optical system 1001, the imaging element 1003, and the like to perform a tour operation of a plurality of imaging positions in random directions.

In the first embodiment, the client device 2100 issues a GetPresetTourOptions command to the surveillance camera 1100 before the preset tour setting window 6802 is displayed. As a response to the command, the surveillance camera 1100 transmits a GetPresetTourOptionsResponse to the client device 2100.

The GetPresetTourOptionsResponse contains, for example, capability information of the surveillance camera 1100 for a random operation regarding a preset tour. The client device 2100 changes the GUI in accordance with the capability information of the random operation, and displays the corresponding GUI.

In the example illustrated in FIG. 6B, the Random check box 7020 for the stay time between tours and the Random check box 7030 for the movement track are grayed out, so that a user cannot perform setting. By such a grayed out display, the user is able to understand that the surveillance camera 1100 (the surveillance camera 1100 itself) cannot perform setting for determining the stay time between tours and the movement track in a random manner.

The client device 2100 performs a display change correspondingly to the description of the capability of the surveillance camera 1100 regarding the stay time between tours and the movement track in the GetPresetTourOptionsResponse.

The client device 2100 according to the first embodiment is configured to acquire, by performing the above-mentioned operation, the capability of the surveillance camera 1100 regarding a random operation for a preset tour in advance and to allow the GUI of the client device 2100 to reflect the capability of the surveillance camera 1100. Accordingly, the user's operability can be improved.

Explanation of Command Response and Data Type

FIG. 7A to 7H illustrate a GetNodes command, a GetNode command, responses to the commands, and the data structure of data regarding the commands and responses. In the first embodiment, a command, a response, and data are defined, for example, using an XML Schema Definition language (hereinafter, may be referred to as an XSD).

FIG. 7A illustrates an example of definition of a GetNodes command. As described above, the GetNodes command is a command for acquiring information of all the PTZNodes held in the surveillance camera 1100. The surveillance camera 1100 according to the first embodiment transmits a GetNodesResponse including information of all the PTZNodes held in the surveillance camera 1100 to the client device 2100.

FIG. 7B illustrates an example of definition of a GetNodesResponse. As illustrated in FIG. 7B, the GetNodesResponse contains a data field of a PTZNode type. A specifier minOccurs="0" indicates that this field is option.

In addition, a specifier maxOccurs="Unbounded" indicates that there is no limitation in the number of settings of the PTZNode field.

FIG. 7C illustrates an example of definition of a GetNode command. As described above, the GetNode command contains, as an internal field, a NodeToken. Based on the NodeToken, the client device 2100 is able to designate a desired PTZNode.

FIG. 7D illustrates an example of definition of a GetNodeResponse. The GetNodeResponse may contain a data field of the PTZNode type.

FIG. 7E illustrates an example of data type definition of the PTZNode type. As described above, this data type is used for the GetNodesResponse and the GetNodeResponse.

As illustrated in FIG. 7E, the data of the PTZNode type is defined as an XML complex type, based on a complexType declaration. Furthermore, the PTZNode type is indicated as an extension type of a DeviceEntity type, based on a complexContent element, an extension element, and a base attribute of the extension element.

Furthermore, a sequence element indicates that data extension is performed such that the order conforms to the definition. In addition, an attribute element indicates that the PTZNode type is a data type in which a Boolean-type FixedHomePosition attribute may be described.

In the first embodiment, the surveillance camera 1100 is able to store information described below in a MaximumNumberOfPresets field of the PTZNode-type data and to transmit the information to the client device 2100. This information indicates the number of presets that can be stored in the surveillance camera 1100 itself.

The MaximumNumberOfPresets field is described as an int type (integer type).

In the first embodiment, the surveillance camera 1100 is able to store information indicating whether or not the surveillance camera 1100 supports a preset tour in an Extension field of the PTZNode-type data and to transmit the information to the client device 2100.

As illustrated in FIG. 7E, the Extension field is data of a PTZNodeExtension type. A specifier minOccurs="0" indicates that the Extension field may be omitted from the PTZNode-type data.

FIG. 7F illustrates an example of data type definition of the PTZNodeExtension type. As illustrated in FIG. 7F, data of the PTZNodeExtension type is defined as an XML complex type, based on a complexType declaration. Further, a sequence element indicates that the PTZNodeExtension type is a data type in which the order conforms to the definition.

In the PTZNodeExtension type, the first field is a SupportedPresetTour field. This field is described as a PTZPresetTourSupported type.

An Extension field of the PTZNodeExtension type is a field provided for future extension. A specifier minOccurs="0" indicates that the Extension field may be omitted.

FIG. 7G illustrates an example of data type definition of a PTZPresetTourSupported type. Based on a complexType declaration, the PTZPresetTourSupported type is defined as an XML complex type. Further, a sequence element indicates that the PTZPresetTourSupported type is a data type in which the order conforms to the definition.

In the PTZPresetTourSupported type, the first field is a MaximumNumberOfPresetTours field. In the first embodiment, the MaximumNumberOfPresetTours field indicates the maximum number of preset tour settings that can be created by the surveillance camera 1100.

The MaximumNumberOfPresetTours field is described as an int type (integer type). By setting a value of 1 or more for the MaximumNumberOfPresetTours field, the surveillance camera 1100 according to the first embodiment is able to present to the client device 2100 that the surveillance camera 1100 supports a preset tour.

Furthermore, in the PTZPresetTourSupported type, the second field is a PTZPresetTourOperation field. This data field is a field for storing information indicating a preset tour-related operation that can be performed by the surveillance camera 1100.

The PTZPresetTourOperation field is described as a PTZPresetTourOperation type. A specifier minOccurs="0" indicates that this field may be omitted.

Furthermore, a specifier maxOccurs="Unbounded" indicates that the field can be described without limitation in the number of descriptions. With this field, the surveillance camera 1100 according to the first embodiment is able to create a list of a plurality of preset tour-related operations that can be performed by the surveillance camera 1100 and to present the list to the client device 2100.

In the PTZPresetTourSupported type, the last field is an Extension field, which is provided for future data extension. A specifier minOccurs="0" indicates that the Extension field may be omitted.

FIG. 7H illustrates an example of definition of the PTZPresetTourOperation type. As illustrated in FIG. 7H, in the PTZPresetTourOperation type, Start, Stop, and Pause operations are defined. In addition, in the PTZPresetTourOperation type, the Extended field is defined for future extension.

FIGS. 8A to 8J illustrate a ModifyPresetTour command and the data structure of data regarding the command. As described above, the ModifyPresetTour command is issued from the client device 2100 in order to change the setting contents of preset tour settings that have already been created by the surveillance camera 1100.

FIG. 8A illustrates an example of definition of a ModifyPresetTour command Based on a complexType declaration, the ModifyPresetTour command is defined as an XML complex type. A sequence element indicates that the ModifyPresetTour command is a command in which the order conforms to the definition.

In the ModifyPresetTour command, the first field is a ProfileToken-type ProfileToken field. In this field, a ProfileToken for identifying a MediaProfile is stored.

In the ModifyPresetTour command, the next field is a PresetTour-type PresetTour field. In this field, preset tour setting contents set by the client device 2100 are stored.

FIG. 8B illustrates an example of data type definition of the PresetTour type. Based on a complexType declaration, this data type is defined as an XML complex type. Further, a sequence element indicates that the PresetTour type is a data type in which the order conforms to the definition.

Furthermore, in the PresetTour type, based on an attribute element, a PresetTourToken may be described as a token attribute of a ReferenceToken type.

The first field of the PresetTour type is a Name field. This field is a name-type field provided such that a name is assigned for a described preset tour. A specifier minOccurs="0" indicates that the Name field may be omitted.

The next field is a Status field. This field is a PTZPresetTourStatus-type field.

The next field is a Boolean-type AutoStart field. With this field, the client device 2100 according to the first embodiment issues to the surveillance camera 1100 an instruction as to whether or not to always activate a preset tour.

When the surveillance camera 1100 receives a ModifyPresetTour command in which this field has a True value, if the surveillance camera 1100 has the corresponding function, a preset tour is always set to active. In the first embodiment, the surveillance camera 1100 may or may not have the AutoStart function.

The next field of the PresetTour type is a StartingCondition field. This field is described as a PTZPresetTourStartingCondition type. The StartingCondition field is a field for issuing to the surveillance camera 1100 an instruction as to how a preset tour is to be operated.

The next field is a TourSpot field. This field is described as PTZPresetTourSpot-type data. The TourSpot field is used for giving a direction about a tour point of a preset tour. A specifier minOccurs="0" indicates that the TourSpot field may be omitted.

Furthermore, a specifier maxOccurs="Unbounded" indicates that the TourSpot field may be described without limitation in the number of descriptions.

In the PresetTour type, the last field is an Extension field. This field is a field provided for future extension. The Extension field is of a PTZPresetTourExtension type. A specifier minOccurs="0" indicates that the Extension field may be omitted.

FIG. 8C illustrates an example of definition of the PresetTourStatus type. FIG. 8D illustrates an example of definition of a PTZPresetTourState type used in the PresetTourStatus type.

FIG. 8E illustrates an example of definition of a PTZPresetTourStartingCondition type. Based on a complexType declaration, this data type is defined as an XML complex type. Further, a sequence element indicates that the PTZPresetTourStartingCondition type is a data type in which the order conforms to the definition.

In the PTZPresetTourStartingCondition type, the first field is a RecurringTime field. This field is described as an int type (integer type). The RecurringTime field is a field for giving a direction about the number of times a preset tour is to be repeated. A specifier minOccurs="0" indicates that the RecurringTime field may be omitted.

The next field is a RecurringDuration field. This field is described as a duration type that is predefined in XML. The duration type is a data type for describing a time interval. The RecurringDuration field is a field for giving, when repeatedly operating preset tours, a direction about a time from completion of a preset tour to start of the next preset tour.

A specifier minOccurs="0" indicates that the RecurringDuration field may be omitted.

In the PTZPresetTourStartingCondition type, the next field is a Direction field. This field is described as a PTZ- PresetTourDirection type. The Direction field is used for designating "Forward" or "Backward" as a tour direction of a preset tour.

When Forward is designated, the surveillance camera 1100 according to the first embodiment performs a tour operation of tour points designated for data of the PTZPresetTourSpot type in the set order. When Backward is designated, the surveillance camera 1100 according to the first embodiment performs a tour operation in the opposite direction.

A specifier minOccurs="0" indicates that the Direction field may be omitted. In the case where this field is omitted, the surveillance camera 1100 according to the first embodiment operates as in the case where "Forward" is designated.

In the first embodiment, "Forward" corresponds to a forward direction, and "Backward" corresponds to a backward direction.

In the PTZPresetTourStartingCondition type, the last field is an Extension field. This field is described as a PTZPresetTourStartingConditionExtension type.

With the Extension field, the client device 2100 according to the first embodiment issues to the surveillance camera 1100 an instruction as to a random operation at the start of a tour operation.

FIG. 8F illustrates data type definition of the PTZPresetTourSpot type. Based on a complexType declaration, this data type is defined as an XML complex type.

Further, a sequence element indicates that the PTZPresetTourSpot type is a data type in which the order conforms to the definition. In the first embodiment, with the data of the PTZPresetTourSpot type, a preset position used in a preset tour and details of an operation regarding the preset position are designated.

The PTZPresetTourSpot type contains a PresetDetail field, a Speed field, and a

StayTime field. The PresetDetail field is data of a PTZPresetTourPresetDetail type. The Speed field is data of a PTZSpeed type. The StayTime field is data of a duration type that is predefined in XML. A specifier minOccurs="0" indicates that the Speed field and the StayTime field may be omitted.

In the PTZPresetTourSpot type, the last field is an Extension field. This field is described as a PTZPresetTourSpotExtension type. With the Extension field, the client device 2100 according to the first embodiment issues to the surveillance camera 1100 an instruction as to a random operation at tour spots of a preset tour.

Further, a specifier minOccurs="0" defines that the Extension field may be omitted.

FIG. 8G illustrates an example of data type definition of the PTZPresetTourPresetDetail type. Based on a complexType declaration, this data type is defined as an XML complex type. Further, a sequence element indicates that the PTZPresetTourPresetDetail type is a data type in which the order conforms to the definition.

A choice element indicates that the PTZPresetTourPresetDetail type has a configuration in which one of elements designated as an element within the choice element is selected.

With the data of the PTZPresetTourPresetDetail type, a tour spot for operation of a preset tour is designated. In the first embodiment, as the tour spot, one of the following fields may be selected: a PresetToken field indicating a preset position that has already been set, a Home field indicating a home position, and a PTZPosition field for directly designating a tour position.

Furthermore, for future extension, a TypeExtension field is defined.

The PresetToken field is described as a ReferenceToken type. The Home field is described as a Boolean type. The PTZPosition field is described as a PTZVector type.

FIG. 8H illustrates an example of data type definition of the PTZPresetTourSpotExtension type. Based on a complexType declaration, this data type is defined as an XML complex type. Further, a sequence element indicates that the PTZPresetTourSpotExtension type is a data type in which the order conforms to the definition.

As described above, in the first embodiment, with the use of the PTZPresetTourSpotExtension type, a random operation at tour spots of a preset tour can be designated. In the first embodiment, for example, an instruction for performing a random operation regarding the tour order of preset positions, moving speed of movement to a set preset position, the stay time at a preset position, the track of movement to a designated preset position, and the like, can be issued.

The PTZPresetTourSpotExtension type contains a RandomOrder field, a RandomSpeed field, a RandomStayTime field, and a RandomTrack field. These fields are described as a Boolean type. A specifier minOccurs="0" indicates that these fields may be omitted.

In the PTZPresetTourSpotExtension type, the first field is a RandomOrder field. When the ModifyPresetTour command in which a True value is set in the RandomOrder field is issued, the client device 2100 issues an instruction to select the tour order of preset positions in a random manner.

In the PTZPresetTourSpotExtension type, the next field is a RandomSpeed field. A RandomSpeed field in which a True value is set indicates that a setting is performed such that movement to designated preset positions in a preset tour is performed at random moving speeds.

In this data type, the third field is a RandomStayTime field. This field is used for issuing an instruction for determining stay times at preset positions in a preset tour in a random manner.

In the PTZPresetTourSpotExtension type, the next field is a RandomTrack field. The RandomTrack field is used for designating that a movement track rendered at the time of movement to a designated preset position is determined by the surveillance camera 1100 in a random manner.

In this data type, the last field is an Extension field. This field is defined for future extension.

FIG. 8I illustrates an example of type definition of the PTZSpeed type. Based on a complexType declaration, this data type is defined as an XML complex type. Further, a sequence element indicates that the PTZspeed type is a data type in which the order conforms to the definition. In this data type, with a PanTilt field, speeds of pan and tilt are designated. Further, with a Zoom field, a zoom speed is designated.

FIG. 8J illustrates an example of data type definition of a PTZPresetTourStartingConditionExtension type. Based on a complexType declaration, this data type is defined as an XML complex type. Further, a sequence element indicates that the PTZPresetTourStartingConditionExtension type is a data type in which the order conforms to the definition.

The data of the PTZPresetTourStartingConditionExtension type contains a RandomRecurringDuration field and a RandomDirection field. The RandomRecurringDuration field and the RandomDirection field are described as a Boolean type.

In the PTZPresetTourStartingConditionExtension type, the first field is a RandomRecurringDuration field. The RandomRecurringDuration field is used for issuing an instruction for determining the standby time between a tour and the next tour in a random manner in the case where preset tours are repeatedly performed.

When the value of the RandomRecurringDuration field is True, the surveillance camera 1100 determines the standby time between tours according to a pseudorandom number.

In this data type, the next field is a RandomDirection field. The RandomDirection field is a field for instructing the surveillance camera 1100 to select a tour direction in a preset tour in a random manner.

The Direction field and the RandomDirection field in the first embodiment correspond to tour direction information.

In this data type, the last field is an Extension field. The Extension field is a field reserved for future extension.

In the first embodiment, as stated above, by defining the ModifyPresetTour command and the data structure of data used for the command, a random operation for a preset tour may be set for the surveillance camera 1100.

FIGS. 9A to 9I illustrate a GetPresetTourOptions command, a GetPresetTourOptionsResponse, and the data structure of data regarding the commands.

As described above, in the first embodiment, the client device 2100 makes an inquiry about the capability of the surveillance camera 1100 for a random operation regarding a preset tour, using the GetPresetTourOptions command. Further, the surveillance camera 1100 transmits the capability of the surveillance camera 1100 for a random operation regarding a preset tour, using the GetPresetTourOptionsResponse.

FIG. 9A illustrates an example of definition of a GetPresetTourOptions command. The GetPresetTourOptions command is defined as an XML complex type, based on a complexType declaration. Further, a sequence element indicates that the GetPresetTourOptions command is a command in which the order conforms to the definition.

In the GetPresetTourOptions command, the first field is a ReferenceToken-type ProfileToken field. In this field, a ProfileToken for identifying a MediaProfile is stored.

In the GetPresetTourOptions command, the next field is a ReferenceToken-type PresetTourToken field. In this field, a PresetTourToken for identifying a ProfileTour desired by a client is stored. A specifier minOccurs="0" defines that the PresetTourToken field may be omitted.

FIG. 9B illustrates an example of definition of the GetPresetTourOptionsResponse. This Response is defined as an XML complex type, based on a complexType declaration. Further, a sequence element indicates that the GetPresetTourOptionsReponse is a response in which the order conforms to the definition.

In the GetPresetTourOptionsReponse, only an Options field is defined as a field for storing data. This field is described as a PTZPresetTourOptions type. In the first embodiment, the surveillance camera 1100 transmits the capability regarding a random operation in a preset tour, which is stored in the Options field.

FIG. 9C illustrates an example of definition of the PTZPresetTourOptions type. The PTZPresetTourOptions type is defined as an XML complex type, based on a complexType declaration. Further, a sequence element indicates that the PTZPresetTourOptions type is a data type in which the order conforms to the definition.

In the PTZPresetTourOptions type, the first field is an AutoStart field. In this field, information indicating whether or not the surveillance camera 1100 supports a function of automatically starting a preset tour is described as a Boolean type.

The AutoStart field in the first embodiment corresponds to an automatic tour instruction for causing the imaging optical system 1001, the imaging element 1003, and the like to perform a tour operation of a plurality of imaging positions.

The next field is a StartingCondition field. In this field, information regarding a support status for a start condition of a preset tour. The StartingCondition field is described as a PTZPresetTourStartingConditionOptions type.

In the PTZPresetTourOptions type, the last field is a TourSpot field. In this field, information regarding a support status for a tour spot in a preset tour is stored. The TourSpot field is described as a PTZPresetTourSpotOptions type.

FIG. 9D illustrates an example of definition of the PTZPreseTourStartingConditionOptions type. This data type is defined as an XML complex type, based on a complexType declaration. Further, a sequence element indicates that the PTZPresetTourStartingConditionOptions type is a data type in which the order conforms to the definition.

In the first embodiment, part of capability information of the surveillance camera 1100 for a random operation regarding a preset tour is contained in the PTZPresetTourStartingConditionOptions type and is transmitted from the surveillance camera 1100.

In the PTZPresetTourStartingConditionOptions type, the first field is a RecurringTime field. In the first embodiment, in this field, the upper and lower limit values of the number of tour times allowable by the surveillance camera 1100 are described.

In the PTZPresetTourStartingConditionOptions type, the next field is a RecurringDuration field. In the first embodiment, in this field, upper and lower limit values regarding the standby time between tours are described.

In the PTZPresetTourStartingConditionOptions type, the next field is a Direction field. In this field, a list of options of a tour direction that may be set for the surveillance camera 1100 is described. The Direction field is described as a PTZPresetTourDirection type, which is not illustrated.

In the PTZPresetTourStartingConditionOptions type, the last field is an Extension field. In the first embodiment, random setting items regarding conditions for starting a tour and the like are contained in the field of the command, and the command is transmitted. The Extension field is described as a PTZPresetTourStartingConditionOptionsExtension type, which will be described later.

A specifier minOccurs="0" indicates that the RecurringTime field, the RecurringDuration field, the Direction field, and the Extension field may be omitted. Further, a specifier maxOccurs="Unbounded" defines that a plurality of directions may be set for the Direction field.

FIG. 9E illustrates an example of definition of the PTZPresetTourStartingConditionOptionsExtension type. This data type is defined as an XML complex type, based on a complexType declaration.

Further, a sequence element indicates that the PTZPresetTourStartingConditionOptionsExtension type is a data type in which the order conforms to the definition. As described above, the PTZPresetTourStartingConditionOptionsExtension type contains random setting items regarding conditions for starting a tour and the like.

In the PTZPresetTourStartingConditionOptionsExtension type, the first field is a RandomRecurringDuration field. This field is used for indicating whether or not the standby time between a tour and the next tour may be determined in a random manner in the case where the surveillance camera 1100 performs a preset tour repeatedly.

The RandomRecurringDuration field is described as a Boolean type. A True value in this field indicates that the surveillance camera 1100 is able to set the standby time in a random manner.

In the PTZPresetTourStartingConditionOptionsExtension type, the next field is a RandomDuration field. This field is used for indicating whether or not a tour direction may be set in a random manner in a preset tour. This field is described as a Boolean type. A True value in this field indicates that the surveillance camera 1100 is able to set the tour direction in a random manner.

In the PTZPresetTourStartingConditionOptionsExtension type, the last field is an Extension field. This field is defined for future extension.

A specifier minOccurs="0" defines that the RandomRecurringDuration field, the RandomDuration field, and the Extension field may be omitted.

In the first embodiment, the RandomRecurringDuration field and the RandomDirection field are each configured such that a True value indicates that setting may be performed in a random manner. However, the RandomRecurringDuration field and the RandomDirection field may each be configured to provide a list of possible values. In this case, a specifier maxOccurs="Unbounded" is added to the definition of the RandomRecurringDuration field and the RandomDirection field.

In this case, for example, it is assumed that the surveillance camera 1100 transmits a GetPresetTourOptionsResponse in which True is set for the RandomDirection field and False is set for the RandomRecurringDuration field.

Such a GetPresetTourOptionsResponse indicates that the standby time between a tour and the next tour may be set in a random manner and that a fixed standby time may also be set.

Furthermore, for example, it is assumed that the surveillance camera 1100 transmits a GetPresetTourOptionsRespose in which only False is set for the RandomDirection field. Such a GetPresetTourOptionsResponse indicates that only a fixed value is set for the standby time and that a standby time is not able to be set in a random manner.

In the first embodiment, the Direction field and the RandomDirection field correspond to designatable tour direction information.

FIG. 9F illustrates an example of definition of a PTZPresetTourSpotOptions2 type. In the first embodiment, with this type, capability information of the surveillance camera 1100 regarding setting of a tour spot for a preset tour may be described. This data type is defined as an XML complex type, based on a complexType declaration. Further, a sequence element indicates that the PTZPresetTourSpotOptions2 type is a data type in which the order conforms to the definition.

Furthermore, in the PTZPresetTourPresetSpotOptions2 type, the last field is an Extension field. As described later, in the first embodiment, this field is configured such that capability regarding a random operation for a tour point in a preset tour may be described. This field is described as a PTZPresetTourSpotOptionsExtension type.

FIG. 9G illustrates an example of definition of a PTZPresetTourPresetDetailOptions type. This data type is defined as an XML complex type, based on a complexType declaration. Further, a sequence element indicates that the PTZPresetTourPresetDetailOptions type is a data type in which the order conforms to the definition.

In the first embodiment, with this type, options of a tour point in a preset tour that may be set for the surveillance camera 1100 may be described.

FIG. 9H illustrates an example of definition of the DurationRange type. This data type is defined as an XML complex type, based on a complexType declaration. Further, a sequence element indicates that the DurationRange type is a data type in which the order conforms to the definition.

With the DurationRange type, a Min field and a Max field of a duration type indicate the value of a time interval that may be set.

FIG. 9I illustrates an example of definition of a PTZPresetTourSpotOptionsExtension type. This data type is defined as an XML complex type, based on a complexType declaration. Further, a sequence element indicates that the PTZPresetTourSpotOptionsExtension type is a data type in which the order conforms to the definition.

As described above, in the first embodiment, with this type, capability regarding a random operation for a tour point is described. In the first embodiment, with this type, capability information regarding random setting of the surveillance camera 1100, such as the tour order of preset positions, the moving speed of movement to a set preset position, the stay time at a preset position, and the track of movement to a designated preset position, is described.

In the PTZPresetTourSpotOptionsExtension type, a RandomOrder field, a RandomSpeed field, a RandomStayTime field, and a RandomTrack field are set. These fields are described as a Boolean type. A specifier minOccurs="0" defines that these fields may be omitted.

In the PTZPresetTourSpotOptionsExtension type, the first field is a RandomOrder field. In the first embodiment, with this field, random setting capability for the tour order of preset positions is described. A True value in this field indicates that the surveillance camera 1100 is able to accept random settings for the tour order of preset positions.

In the PTZPresetTourSpotOptionsExtension type, the next field is a RandomSpeed field. In the first embodiment, random setting capability regarding the moving speed of movement to a preset position designated by the field is described. A True value in this field indicates that the surveillance camera 1100 is able to accept random settings for the tour speed.

In the PTZPresetTourSpotOptionsExtension type, the next field is a RandomStayTime field. In the first embodiment, this field indicates information of whether or not the stay time at a target tour point may be set in a random manner A True value in this field indicates that the surveillance camera 1100 is able to accept random settings for the stay time.

In the PTZPresetTourSpotOptionsExtension type, the next field is a RandomTrack field. In the first embodiment, this field indicates information of whether or not the surveillance camera 1100 is able to determine the track of movement to a designated preset position in a random manner. In the first embodiment, a True value in this field indicates that the surveillance camera 1100 is able to accept random settings for the movement track.

In the PTZPresetTourSpotOptionsExtension type, the last field is an Extension field. This field is defined for future extension.

As described above, with the data structure of data stored in the GetPresetTourOptionsResponse in the first embodiment, the capability of the surveillance camera 1100 for a random operation may be configured to be able to be transmitted and received.

Even in the case where the RandomOrder field is configured to be a PTZPresetTourStartingCondition type, instead of a PTZPresetTourSpotOptionsExtension type, similar effects may be achieved.

Figure 10:
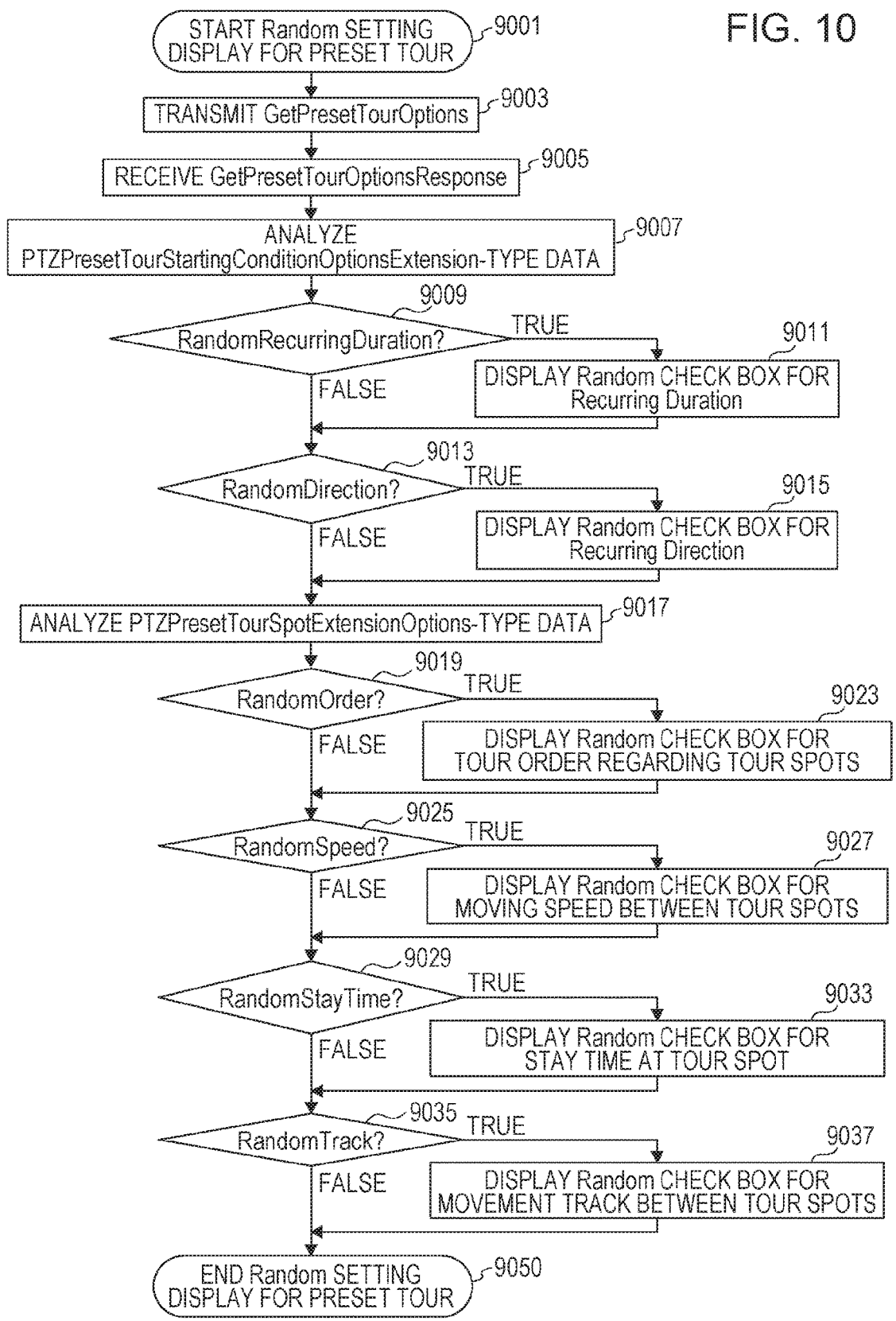
FIG. 10 is a flowchart illustrating a method for displaying a graphical user interface in a client device.

FIG. 10 is a flowchart illustrating a GUI display method for the client device 2100 according to the first embodiment.

Referring to FIG. 10, in step 9001, the CPU 2026 starts a random setting display process for a preset tour.

In step 9003, the CPU 2026 instructs the I/F 2014 to transmit a GetPresetTourOptions command to the surveillance camera 1100.

In step 9005, the CPU 2026 receives a GetPresetTourOptionsReponse via the I/F 2014.

In step 9007, the CPU 2026 analyzes PTZPresetTourStartingConditionOptionsExtension-type data contained in the GetPresetTourOptionsResponse.

In step 9009, the CPU 2026 determines the value of a RandomRecurringDuration field contained in the PTZPresetTourStartingConditionOptionsExtension-type data. Then, when the CPU 2026 determines that the value of the field is True, the process proceeds to step 9011.

In contrast, when the CPU 2026 determines that the value of the field is False, the CPU 2026 grays out the Random check box 7020 so that the Random check box 7020 cannot be selected. Then, the process proceeds to step 9013.

The CPU 2026 is configured to gray out the Random check box 7020 so that the Random check box 7020 cannot be selected when it is determined in step 9009 in the first embodiment that the value of the RandomRecurringDuration field is False. However, the CPU 2026 is not necessarily configured as described above. For example, the CPU 2026 may be configured not to display the Random check box 7020 so that the Random check box 7020 cannot be selected in this case.

In step 9011, the CPU 2026 displays the Random check box 7020.

In step 9013, the CPU 2026 determines the value of a RandomDirection field. Similar to the RandomRecurringDuration field mentioned above, the RandomDirection field is also contained in the PTZPresetTourStartingConditionOptionsExtension-type data.

When the CPU 2026 determines that the value of this field is True, the process proceeds to step 9015. In contrast, when the CPU 2026 determines that the value of this field is False, the CPU 2026 grays out the Random check box 7022 so that the Random check box 7022 cannot be selected. Then, the process proceeds to step 9013.

The CPU 2026 is configured to gray out the Random check box 7022 so that the Random check box 7022 cannot be selected when it is determined in step 9013 in the first embodiment that the value of the RandomDirection field is False. However, the CPU 2026 is not necessarily configured as described above. For example, the CPU 2026 may be configured not to display the Random check box 7022 so that the Random check box 7022 cannot be selected in this case.

In step 9015, the CPU 2026 displays the Random check box 7022.

In the first embodiment, the client application window 6800 in which the Random check box 7022 is displayed corresponds to a selection screen for allowing a user to select a direction in which the imaging optical system 1001, the imaging element 1003, and the like are caused to perform a tour operation of a plurality of imaging positions. Furthermore, in the first embodiment, the CPU 2026 corresponds to a display control unit which causes this selection screen to be displayed on the display unit 2022.

In step 9017, the CPU 2026 analyzes PTZPresetTourSpotOptionsExtension-type data contained in the GetPresetTourOptionsResponse.

In step 9019, the CPU 2026 determines the value of a RandomOrder field contained in the PTZPresetTourSpotOptionsExtension-type data. When the CPU 2026 determines that the value of this field is True, the process proceeds to step 9023.

In contrast, when the CPU 2026 determines that the value of the RandomOrder field is False, the CPU 2026 grays out the Random check box 7024 so that the Random check box 7024 cannot be selected. Then, the process proceeds to step 9025.

The CPU 2026 is configured to gray out the Random check box 7024 so that the Random check box 7024 cannot be selected when it is determined in step 9019 in the first embodiment that the value of the RandomOrder field is False. However, the CPU 2026 is not necessarily configured as described above. For example, the CPU 2026 may be configured not to display the Random check box 7024 so that the Random check box 7024 cannot be selected in this case.

In step 9023, the Random check box 7024 for a tour order regarding tour spots is displayed.

In step 9025, the CPU 2026 determines the value of a RandomSpeed field. This field is contained in the PTZPresetTourSpotOptionsExtension-type data. When the CPU 2026 determines that the value of this field is True, the process proceeds to step 9027.

In contrast, when the CPU 2026 determines that the value of this field is False, the CPU 2026 grays out the Random check box 7026 so that the Random check box 7026 cannot be selected. Then, the process proceeds to step 9029.

The CPU 2026 is configured to gray out the Random check box 7026 so that the Random check box 7026 cannot be selected when it is determined in step 9025 in the first embodiment that the value of the RandomSpeed field is False. However, the CPU 2026 is not necessarily configured as described above. For example, the CPU 2026 may be configured not to display the Random check box 7026 so that the Random check box 7026 cannot be selected in this case.

In step 9027, the CPU 2026 displays the Random check box 7026 for the moving speed of movement between tour spots.

In step 9029, the CPU 2026 determines the value of a RandomStayTime field. The RandomStayTime field is contained in the PTZPresetTourSpotOptionsExtension-type data. When the CPU 2026 determines that the value of this field is True, the process proceeds to step 9033.

In contrast, when the CPU 2026 determines that the value of the RandomStayTime field is False, the CPU 2026 grays out the Random check box 7028 so that the Random check box 7028 cannot be selected. Then, the process proceeds to step 9035.

In step 9033, the Random check box 7028 for the stay time at a tour spot is displayed.

In step 9035, the CPU 2026 determines the value of a RandomTrack field. This field is contained in the PTZPresetTourSpotOptionsExtension-type data. When the CPU 2026 determines that the value of this field is True, the process proceeds to step 9037.

In contrast, when the CPU 2026 determines that the value of the RandomTrack field is False, the CPU 2026 grays out the Random check box 7030 so that the Random check box 7030 cannot be selected. Then, the process proceeds to step 9050.

The CPU 2026 is configured to gray out the Random check box 7030 so that the Random check box 7030 cannot be selected when it is determined in step 9035 in the first embodiment that the value of the RandomTrack field is False. However, the CPU 2026 is not necessarily configured as described above. For example, the CPU 2026 may be configured not to display the Random check box 7030 so that the Random check box 7030 cannot be selected in this case.

In step 9037, the CPU 2026 displays the Random check box 7030 for the track of movement between tour spots.

In step 9050, the CPU 2026 ends the random setting display process for a preset tour in the first embodiment.

The client device 2100 according to the first embodiment is configured to acquire the capability of the surveillance camera 1100 regarding a random operation for a preset tour in advance by performing the operation described above, so that the capability of the surveillance camera 1100 can be reflected in the GUI of the client device 2100. Accordingly, user's operability may be improved.

FIGS. 11A and 11B illustrate configuration examples of a GetPresetTourOptions command used in the first embodiment and a GetPresetTourOptionsResponse, which is a response to the GetPresetTourOptions command Specific configurations of the GetPresetTourOptions command and the GetPresetTourOptionsReponse will be explained below with reference to FIGS. 11A and 11B.

FIG. 11A illustrates a configuration example of the GetPresetTourOptions command. This command is configured, for example, as a SOAP message. In the first embodiment, the GetPresetTourOptions command is used for the client device 2100 to make an inquiry about the capability of the surveillance camera 1100 for a random operation regarding a preset tour.

As illustrated in FIG. 11A, the GetPresetTourOptions command in which a ProfileToken for a Media Profile and a PresetTourToken for a preset tour set in the Media Profile are designated is issued. In the example illustrated in FIG. 11A, "H264_01" is set as the value of the ProfileToken, and "RandomTour_01" is set as the value of the PresetTourToken.

FIG. 11B illustrates a configuration example of the GetPresetTourOptionsResponse. In the first embodiment, this response is configured as a SOAP message, as with the command. In the first embodiment, the GetPresetTourOptionsResponse is used for the surveillance camera 1100 to present its own capability regarding a random operation in a preset tour.

As illustrated in FIG. 11B, a RandomRecurringDuration field and a RandomDirection field are described within an Extension field within a StartingCondition field.

Further, a RandomOrder field, a RandomSpeed field, a RandomStayTime field, and a RandomTrack field are described within an Extension field within a TourSpot field.

In the example illustrated in FIG. 11B, a False value and a True value are stored in the RandomRecurringDuration field and the RandomDirection field, respectively.

Further, True values are stored both in the RandomOrder field and the RandomSpeed field. Further, a True value and a False value are stored in the RandomStayTime field and the RandomTrack field, respectively.

The client device 2100 receives the GetPresetTourOptionsReponse in which corresponding values are stored, and performs display settings of the GUI illustrated, for example, in FIG. 6.

With this configuration, the client device 2100 according to the first embodiment is able to transmit and receive the capability of the surveillance camera 1100 for a random operation regarding a preset tour. Furthermore, the client device 2100 according to the first embodiment is able to receive the capability regarding the random operation and change the display of the GUI. Therefore, a user is able to easily understand contents that may be set. Thus, user's operability may be improved.

The RandomOrder field is not necessarily described in the Extension field within the TourSpot field. For example, even in the case where the data structure is changed such that the RandomOrder field is described in the Extension field within the StartingCondition field, similar effects may be achieved.

Second Embodiment

FIGS. 12A to 12C illustrate a configuration example of a PTZPresetTourStartingConditionExtension type according to a second embodiment. The same elements as those in the first embodiment will be referred to with the same signs as those in the first embodiment, and explanation of those same elements will be omitted.

FIG. 12A illustrates a configuration example of a PTZPresetTourStartingConditionExtension type. Referring to FIG. 12A, the first field of the PTZPresetTourStartingConditionExtension type is an ExtendedRecurringDuration field. This field is described as a PTZPresetTourRecurringDurationExtended type.

Further, the next field of the PTZPresetTourStartingConditionExtension type is an ExtendedDirection field. This field is described as a PTZPresetTourDirectionExtended type.

In the second embodiment, the last field of the PTZPresetTourStartingConditionExtension type is an Extension field. This field is a field reserved for future extension.

FIG. 12B illustrates a configuration example of the PTZPresetTourRecurringDurationExtended type. This type is defined as an XML simple type, based on an XML simpleType declaration. Further, a restriction declaration indicates that this type is a restricted type in which the value of an XML pre-defined string type is restricted.

In this type, an enumeration element defines that this type may take Random and Extended values. In the second embodiment, with this field, this type is used for issuing an instruction to determine a standby time between a tour and the next tour in a random manner in the case where preset tours are repeatedly performed.

When this value is Random, the surveillance camera 1100 determines the standby time between the tours based on a pseudorandom number.

FIG. 12C illustrates an example of definition of the PTZPresetTourDirectionExtended type. This type is defined as an XML simple type, based on an XML simpleType declaration. Further, a restriction declaration indicates that this type is a restricted type in which the value of an XML pre-defined string type is restricted.

In this type, an enumeration element defines that this type may take Random and Extended values. In the second embodiment, with this field, the surveillance camera 1100 is instructed to select a tour direction in a random manner in a preset tour. When the value of this field is Random, the surveillance camera 1100 selects the tour direction of the preset tour in a random manner.

In the second embodiment, with this configuration, the surveillance camera 1100 may be instructed to select the standby time between tours and a tour direction for a preset tour in a random manner.

In the second embodiment, random selection is not limited to the standby time between tours and a tour direction. With the configuration described in the second embodiment, a random operation for a preset tour, such as the tour order of tour points, the moving speed of movement to a tour point, the stay time at a tour point, and the track of movement to a tour point, may also be achieved.

Furthermore, although instructions to the surveillance camera 1100 for a random operation regarding a preset tour have been explained in the second embodiment, a similar configuration may also be applied to the case where the capability of the surveillance camera 1100 for a random operation regarding a preset tour is transmitted and received.

In this case, the second embodiment is applied to data of the above-mentioned PTZPresetTourStartingConditionOptionsExtension type or PTZPresetTourSpotOptionsExtension type. With this configuration, the client device 2100 according to the second embodiment is able to transmit and receive the capability of the surveillance camera 1100 for a random operation regarding a preset tour.

Furthermore, the client device 2100 according to the second embodiment is able to receive the capability regarding the random operation and change the display of the GUI. Therefore, a user is able to easily understand contents that may be set, and user's operability may be improved.

Third Embodiment

FIGS. 13A and 13B illustrate a configuration example of a PTZPresetTourStartingCondition type according to a third embodiment. The same elements as those in the foregoing embodiments will be referred to with the same signs as those in the foregoing embodiments, and explanation of those same elements will be omitted.

In the PTZPresetTourStartingCondition type illustrated in FIGS. 13A and 13B, the capability of the surveillance camera 1100 according to the third embodiment for a random operation regarding a preset tour is described with an attribute element of this type.

FIG. 13A illustrates a configuration example in the case where an XML pre-defined string type is used for the attribute element.

In the configuration example of the PTZPresetTourStartingCondition type illustrated in FIG. 13A, the first attribute is ExtendedRecurringDuration. This attribute is used for issuing an instruction to determine the standby time between a tour and the next tour in a random manner in the case where preset tours are repeatedly performed.

When the value of this attribute is Random, the surveillance camera 1100 determines the standby time between the tours based on a pseudorandom number.

In the configuration example of the PTZPresetTourStartingCondition type illustrated in FIG. 13A, the second attribute is ExtendedDirection. This attribute is used for instructing the surveillance camera 1100 to select a tour direction in a preset tour in a random manner.

When the value of this attribute is Random, the surveillance camera 1100 selects the tour direction of the preset tour in a random manner.

FIG. 13B illustrates a configuration example in the case where a Boolean type is used for an attribute element.

In the configuration example of the PTZPresetTourStartingCondition type illustrated in FIG. 13B, the first attribute is RandomRecurringDuration. This attribute is used for issuing an instruction to determine the standby time between a tour and the next tour in a random manner in the case where preset tours are repeatedly performed.

When the value of this attribute is True, the surveillance camera 1100 determines the standby time between the tours based on a pseudorandom number.

In the configuration example of the PTZPresetTourStartingCondition type illustrated in FIG. 13B, the second attribute is RandomDirection. This attribute is used for instructing the surveillance camera 1100 to select a tour direction in a preset tour in a random manner. When the value of this attribute is True, the surveillance camera 1100 selects a tour direction of a preset tour in a random manner.

With this configuration, in the third embodiment, the surveillance camera 1100 may be instructed to perform selection of the standby time between tours and a tour direction for a preset tour in a random manner.

In the third embodiment, random selection is not limited to the standby time between tours and a tour direction. With the configuration described in the third embodiment, a random operation for a preset tour, such as the tour order of tour points, the moving speed of movement to a tour point, the stay time at a tour point, and the track of movement to a tour point, may also be achieved.

Furthermore, although instructions to the surveillance camera 1100 for a random operation regarding a preset tour have been explained in the third embodiment, a similar configuration may also be applied to the case where the capability of the surveillance camera 1100 for a random operation regarding a preset tour is transmitted and received.

In this case, the third embodiment is applied to data of the above-mentioned PTZPresetTourStartingConditionOptionsExtension type or PTZPresetTourSpotOptionsExtension type. With this configuration, the client device 2100 according to the third embodiment is able to transmit and receive the capability of the surveillance camera 1100 for a random operation regarding a preset tour.

The client device 2100 according to the third embodiment is able to receive the capability regarding the random operation and to change the display of the GUI. Therefore, a user is able to easily understand contents that may be set, and user's operability may be improved.

In the foregoing embodiments, the surveillance camera 1100 may be configured to transmit an error response to the client device 2100.

The present invention has been described along with various embodiments. However, the present invention is not limited to the embodiments described above. Various changes may be made to the present invention within the scope of the present invention.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133947, filed Jun. 26, 2013, which is hereby incorporated by reference herein in its entirety.

The invention claimed is:

1. A method for controlling a client device that is capable of communicating, via a network, with a camera configured to include an imaging unit configured to capture an image of an object, the method comprising:
   a transmitting step of transmitting to the camera an inquiry command about capability of a tour operation including a forward direction tour operation, a backward direction tour operation, and a random tour operation,
   wherein the camera selects, in the forward direction tour operation, an imaging position from among a plurality of imaging positions in predetermined order,
   wherein the camera selects, in the backward direction tour operation, an imaging position from among the plurality of imaging positions in reverse order that is opposite of the predetermined order, and
   wherein the camera randomly selects, in the random tour operation, an imaging position from among the plurality of imaging positions;
   a receiving step of receiving capability information indicating the capability of the tour operation which is transmitted from the camera in response to the inquiry command; and
   a control step of displaying a user interface for selecting the tour operation, in accordance with the capability information received in the receiving step, wherein the user interface displayed in the control step is a user interface in which a tour operation which the camera is able to operate is selectable and a tour operation which the camera is not able to operate is not selectable.

2. The method for controlling the client device according to claim 1, wherein the capability information indicates whether the camera is capable of performing the random tour operation.

3. The method for controlling the client device according to claim 1, wherein the capability information further indicates whether the camera is capable of performing the random tour operation with random speed.

4. The method for controlling the client device according to claim 1, wherein the capability information further indicates whether or not times at which the imaging unit is caused to stop at the plurality of imaging positions when the imaging unit is caused to perform the tour operation of the plurality of imaging positions are able to be set in a random manner.

5. The method for controlling the client device according to claim 1, wherein the capability information further indicates whether or not a time from a time at which the imaging unit is caused to perform the tour operation of the plurality of imaging positions to a time at which the imaging unit is caused to perform a new tour operation of a plurality of imaging positions is able to be set in a random manner.

6. A method for controlling a camera configured to include an imaging unit configured to be capable of communicating with a client device via a network and to capture an image of an object, the method comprising:
   a receiving step of receiving, from the client device via the network, an inquiry command about capability of a tour operation including a forward direction tour operation, a backward direction tour operation, and a random tour operation,
   wherein the camera selects, in the forward direction tour operation, an imaging position from among a plurality of imaging positions in predetermined order,
   wherein the camera selects, in the backward direction tour operation, an imaging position from among the plurality of imaging positions in reverse order that is opposite of the predetermined order, and
   wherein the camera randomly selects, in the random tour operation, an imaging position from among the plurality of imaging positions; and
   a transmitting step of transmitting, in response to the inquiry command, capability information indicating the capability of the tour operation to the client device via the network, such that the client device displays a user interface for selecting the tour operation in accordance with the transmitted capability information, wherein the user interface displayed by the client device is a user interface in which a tour operation which the camera is able to operate is selectable and a tour operation which the camera is not able to operate is not selectable.

7. The method for controlling the camera according to claim 6, wherein the capability information indicates whether the camera is capable of performing the random tour operation.

8. The method for controlling the camera according to claim 6, wherein the capability information further indicates whether the camera is capable of performing the random tour operation with random speed.

9. The method for controlling the camera according to claim 6, wherein the capability information further indicates whether or not times at which the imaging unit is caused to stop at the plurality of imaging positions when the imaging unit is caused to perform the tour operation of the plurality of imaging positions are able to be set in a random manner.

10. The method for controlling the camera according to claim 6, wherein the capability information further indicates whether or not a time from a time at which the imaging unit is caused to perform the tour operation of the plurality of imaging positions to a time at which the imaging unit is caused to perform a new tour operation of a plurality of imaging positions is able to be set in a random manner.

11. A client device configured to communicate, via a network, with a camera configured to include an imaging unit configured to capture an image of an object, the client device comprising:
   a transmitting unit configured to transmit to the camera an inquiry command about capability of a tour operation including a forward direction tour operation, a backward direction tour operation, and a random tour operation,
   wherein the camera selects, in the forward direction tour operation, an imaging position from among a plurality of imaging positions in predetermined order,
   wherein the camera selects, in the backward direction tour operation, an imaging position from among the plurality of imaging positions in reverse order that is opposite of the predetermined order, and wherein the camera randomly selects, in the random tour operation, an imaging position from among the plurality of imaging positions;

a receiving unit configured to receive the capability of the tour operation which is transmitted from the camera in response to the inquiry command; and a display control unit configured to display a user interface for selecting the tour operation in accordance with the capability information received by the receiving unit, wherein the user interface displayed by the display control unit is a user interface in which a tour operation which the camera is able to operate is selectable and a tour operation which the camera is not able to operate is not selectable.

12. A camera configured to be capable of communicating with a client device via a network and to capture an image of an object, the camera comprising:

a receiving unit configured to receive, from the client device via the network, an inquiry command about capability of a tour operation including a forward direction tour operation, a backward direction tour operation, and a random tour operation, wherein the camera selects, in the forward direction tour operation, an imaging position from among a plurality of imaging positions in predetermined order, wherein the camera selects, in the backward direction tour operation, an imaging position from among the plurality of imaging positions in reverse order that is opposite of the predetermined order, and wherein the camera randomly selects, in the random tour operation, an imaging position from among the plurality of imaging positions; and a transmitting unit configured to transmit capability information indicating the capability of the tour operation which is transmitted from the camera in response to the inquiry command to the client device via the network such that the client device displays a user interface for selecting the tour operation in accordance with the transmitted capability information, wherein the user interface displayed by the client device is a user interface in which a tour operation which the camera is able to operate is selectable and a tour operation which the camera is not able to operate is not selectable.

* * * * *